United States Patent
Zhang et al.

(10) Patent No.: US 12,256,340 B2
(45) Date of Patent: Mar. 18, 2025

(54) POWER DETERMINATION AND SIGNAL TRANSMISSION METHODS, APPARATUS, NETWORK DEVICE AND STORAGE MEDIUM

(71) Applicant: ZTE CORPORATION, Shenzhen (CN)

(72) Inventors: Shujuan Zhang, Shenzhen (CN); Feng Bi, Shenzhen (CN); Chuangxin Jiang, Shenzhen (CN); Xing Liu, Shenzhen (CN); Ke Yao, Shenzhen (CN); Jie Chen, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 880 days.

(21) Appl. No.: 17/265,781

(22) PCT Filed: Aug. 2, 2019

(86) PCT No.: PCT/CN2019/099118
§ 371 (c)(1),
(2) Date: Apr. 26, 2021

(87) PCT Pub. No.: WO2020/025065
PCT Pub. Date: Feb. 6, 2020

(65) Prior Publication Data
US 2021/0258889 A1    Aug. 19, 2021

(30) Foreign Application Priority Data

Aug. 3, 2018 (CN) .......................... 201810880268.7

(51) Int. Cl.
*H04W 52/32* (2009.01)
*H04W 52/04* (2009.01)
(Continued)

(52) U.S. Cl.
CPC ......... *H04W 52/325* (2013.01); *H04W 52/04* (2013.01); *H04W 52/365* (2013.01);
(Continued)

(58) Field of Classification Search
CPC ............. H04W 52/325; H04W 52/365; H04W 52/367; H04W 56/0045; H04W 52/18;
(Continued)

(56) References Cited

U.S. PATENT DOCUMENTS

| 2009/0203310 A1 | 8/2009 | Lozano et al. |
| 2011/0275335 A1 | 11/2011 | Luo et al. |

(Continued)

FOREIGN PATENT DOCUMENTS

| CN | 102811469 A | 12/2012 |
| CN | 104518845 | 4/2015 |

(Continued)

OTHER PUBLICATIONS

Managing Femto to Macro Interference without X2 Interface Support through POMDP . Author : Galindo-Serrano, Ana ; Giupponi, Lorenza (Year: 2012).*

(Continued)

*Primary Examiner* — Jutai Kao
(74) *Attorney, Agent, or Firm* — Knobbe, Martens, Olson & Bear, LLP

(57) ABSTRACT

Disclosed is a power determination method, including: a first communication node determines power information according to at least one of signaling information and an agreed rule, where the power information includes at least one of: first-type power information associated with a first-type channel or signal, second-type power information associated with a second-type channel or signal, or third-type power information associated with the first-type channel or signal; where an acquisition parameter of the first-type (Continued)

```
┌─────────────────────────────────────────────────────────┐
│ A fourth communication node determines power            │
│ information of a channel or a signal according to       │─── S610
│ received first signaling information or an agreed rule  │
└─────────────────────────────────────────────────────────┘
                           │
                           ▼
┌─────────────────────────────────────────────────────────┐
│ Transmit a channel or a signal according to the         │─── S620
│ determined power information                            │
└─────────────────────────────────────────────────────────┘
``` power information comprises the second-type power information, and an acquisition parameter of the third-type power information do not comprise the second-type power information; and where the first-type channel or signal is a channel or a signal between the first communication node and a second communication node, and the second-type channel or signal is a channel or a signal between the first communication node and one or more third communication nodes.

16 Claims, 6 Drawing Sheets

(51) Int. Cl.
    *H04W 52/36*     (2009.01)
    *H04W 56/00*     (2009.01)
    *H04W 72/20*     (2023.01)

(52) U.S. Cl.
    CPC ..... *H04W 52/367* (2013.01); *H04W 56/0045* (2013.01); *H04W 72/20* (2023.01)

(58) Field of Classification Search
    CPC ... H04W 52/346; H04W 52/46; H04W 52/16; H04W 52/247; H04W 52/42; H04W 52/246; H04W 52/0203; H04W 52/14; H04L 5/00; H04L 5/0007; H04L 1/0029
    See application file for complete search history.

(56) References Cited

U.S. PATENT DOCUMENTS

| | | | |
|---|---|---|---|
| 2012/0083203 A1 | 4/2012 | Truong et al. | |
| 2014/0126530 A1 | 5/2014 | Siomina | |
| 2014/0269597 A1* | 9/2014 | Park | H04W 52/262 370/329 |
| 2016/0373225 A1* | 12/2016 | Kim | H04L 25/0224 |
| 2016/0380736 A1 | 12/2016 | Ahn et al. | |
| 2017/0019818 A1 | 1/2017 | Xing et al. | |
| 2019/0141638 A1* | 5/2019 | Li | H04W 52/247 |
| 2019/0159144 A1* | 5/2019 | Zhang | H04W 72/21 |
| 2019/0306802 A1* | 10/2019 | Liu | H04W 52/24 |
| 2020/0187125 A1* | 6/2020 | Pan | H04W 52/346 |
| 2021/0099958 A1* | 4/2021 | Bae | H04W 52/146 |
| 2021/0127413 A1* | 4/2021 | Lu | H04W 72/044 |
| 2021/0368488 A1* | 11/2021 | Zhang | H04W 72/044 |

FOREIGN PATENT DOCUMENTS

| | | |
|---|---|---|
| CN | 104581848 A | 4/2015 |
| CN | 104604302 A | 5/2015 |
| CN | 104853424 | 8/2015 |
| CN | 106936555 A | 7/2017 |
| CN | 107547179 | 1/2018 |
| CN | 107872813 A | 4/2018 |
| CN | 108112065 | 6/2018 |
| CN | 108134659 A | 6/2018 |
| CN | 108141825 | 6/2018 |
| CN | 108289324 | 7/2018 |
| EP | 3 042 529 A1 | 7/2016 |
| WO | WO 2013/185690 A1 | 12/2013 |

OTHER PUBLICATIONS

Chinese Office Action of Nov. 24, 2021 for Chinese Patent Application No. 201810880268.7.
Chinese Search Report of Nov. 18, 2021 for Chinese Patent Application No. 201810880268.7.
Apr. 4, 2022 Supplementary Partial European Search Report for Application No. EP 19 84 3985 (31 pages).
International Search Report for PCT/CN2019/099118 dated Oct. 29, 2019.
ZTE, "Discussion on IAB node access procedure", 3GPP TSG-RAN WG2 Meeting #102, R2-1807401, Busan, Korea May 21-25, 2018.
Chinese Search Report for Chinese Application No. 202211099261, dated Sep. 26, 2024.
Chinese Office Action for Chinese Application No. 202211099926. 1, dated Oct. 8, 2024.

* cited by examiner

POWER DETERMINATION AND SIGNAL TRANSMISSION METHODS, APPARATUS, NETWORK DEVICE AND STORAGE MEDIUM

CROSS-REFERENCE TO RELATED APPLICATIONS

THIS IS A NATIONAL STAGE APPLICATION FILED UNDER 35 U.S.C. 371 BASED ON INTERNATIONAL PATENT APPLICATION NO. PCT/CN2019/099118, FILED ON Aug. 2, 2019, WHICH CLAIMS PRIORITY TO CHINESE PATENT APPLICATION NO. 201810880268.7 FILED ON Aug. 3, 2018, THE DISCLOSURES OF BOTH OF WHICH ARE INCORPORATED HEREIN BY REFERENCE IN THEIR ENTIRETIES.

TECHNICAL FIELD

Embodiments of the present application relate to the field of communications, and for example, to power determination and signal transmission methods, apparatuses, a network device, and a storage medium.

BACKGROUND

An integrated access backhaul (IAB) is used as a relay, and the IAB needs to process signals of a backhaul link and signals of an access link. As shown in FIG. 1, the receiving can be simultaneously on a downlink backhaul (DB) link and an uplink access (UA) link by way of a frequency division multiplexing/spatial division multiplexing (FDM/SDM), or the transmission can be simultaneously on an uplink backhaul (UB) link and a downlink access (DA) link by way of the FDM/SDM. A power sharing problem of simultaneously transmitted signals needs to be considered, for example, when a UB and a DA share one power amplifier, the power sharing problem between two signals needs to be considered. On the other hand, regarding signals transmitted simultaneously on two links, since one signal is transmitted by a base station and the other is transmitted by a terminal, or since a scheduling of the backhaul link is controlled by an IAB node1 (node 1)/an IAB donor node (master node) in FIG. 1, a scheduling of the access link is controlled by an IAB node2 (node 2), so that transmission power of the two signals are not equal, stronger interference is caused, and thus an interference problem of the signals simultaneously transmitted on the two links also needs to be further considered. How to determine power information is therefore an urgent problem to be solved.

SUMMARY

Embodiments of the present application provide power determination and signal transmission methods, apparatuses, a network device, and a storage medium, and a main technical problem to be solved is that how to accurately determine power information associated with a communication channel or signal between communication nodes.

An embodiment of the present application provides a power determination method. The power determination method includes: a first communication node determines power information according to at least one of received signaling information or an agreed rule, where the power information includes at least one of: first-type power information associated with a first-type channel or signal, second-type power information associated with a second-type channel or signal, or third-type power information associated with the first-type channel or signal.

An acquisition parameter of the first-type power information includes the second-type power information, and an acquisition parameter of the third-type power information do not include the second-type power information.

The first-type channel or signal is a channel or a signal between the first communication node and a second communication node, and the second-type channel or signal is a channel or a signal between the first communication node and one or more third communication nodes. Please refer to FIG. 1, the first communication node in each embodiment of the present disclosure corresponds to an IAB node2 in FIG. 1, the second communication node corresponds to an IAB node1/IAB donor node in FIG. 1, and the third communication node corresponds to IAB node3/UE in FIG. 1. Unless otherwise specified, the communication nodes in each embodiment of the present disclosure are all in the aforementioned corresponding relationship.

An embodiment of the present application further provides a power determination method. The power determination method includes: a second communication node receives request information transmitted by a first communication node; and/or the second communication node transmits signaling information to the first communication node; where the request information and/or the signaling information includes at least one of: first-type power information associated with a first-type channel or signal, second-type power information associated with a second-type channel or signal, or third-type power information associated with the first-type channel or signal.

An acquisition parameter of the first-type power information includes the second-type power information, and an acquisition parameter of the third-type power information do not include the second-type power information.

The first-type channel or signal is a channel or a signal between the first communication node and the second communication node, and the second-type channel or signal is a channel or a signal between the first communication node and one or more third communication nodes.

An embodiment of the present application further provides a signal transmission method. The signal transmission method includes: a fourth communication node determines power information of a channel or a signal according to received first signaling information or an agreed rule; and the channel or the signal is transmitted according to the determined power information.

An embodiment of the present application further provides a power determination method. The power determination method includes: a first communication node requests or feeds back power information associated with a first-type channel or signal between the first communication node and a second communication node, to the second communication node.

An embodiment of the present application further provides a power determination apparatus. The power determination apparatus includes a power information determination module. The power information determination module is configured to determine power information according to at least one of received signaling information or an agreed rule, where the power information includes at least one of: first-type power information associated with a first-type channel or signal, second-type power information associated with a second-type channel or signal, or third-type power information associated with the first-type channel or signal.

An acquisition parameter of the first-type power information includes the second-type power information, and an acquisition parameter of the third-type power information do not include the second-type power information.

The first-type channel or signal is a channel or a signal between the first communication node and a second communication node, and the second-type channel or signal is a channel or a signal between the first communication node and one or more third communication nodes.

An embodiment of the present application further provides a power determination apparatus. The power determination apparatus includes a power information communication module. The power information communication module is configured to receive request information transmitted by a first communication node, and/or transmit signaling information to the first communication node, where at least one of the request information or the signaling information includes at least one of: first-type power information associated with a first-type channel or signal, second-type power information associated with a second-type channel or signal, or third-type power information associated with the first-type channel or signal.

An acquisition parameter of the first-type power information includes the second-type power information, and an acquisition parameter of the third-type power information do not include the second-type power information; and The first-type channel or signal is a channel or a signal between the first communication node and the second communication node, and the second-type channel or signal is a channel or a signal between the first communication node and one or more third communication nodes.

An embodiment of the present application further provides a signal transmission apparatus. The signal transmission apparatus includes a power determination module and an information transmission module. The power determination module is configured to determine power information of a channel or a signal according to received first signaling information or an agreed rule. The information transmission module is configured to transmit the channel or the signal according to the determined power information.

An embodiment of the present application further provides a power determination apparatus. The power determination apparatus includes a power information request module. The power information request module is configured to request or feed back, to the second communication node, power information associated with a first-type channel or signal between a first communication node and a second communication node.

An embodiment of the present application further provides a network device. The network device includes a processor, a memory, and a communication bus. The communication bus is configured to enable a connection communication between the processor and the memory; the processor is configured to execute one or more computer programs stored in the memory, to implement at least one of: steps of the power determination method described above, steps of the signal transmission method described above, or steps of the power determination method described above.

An embodiment of the present application further provides a computer storage medium, where the computer readable storage medium stores one or more programs, the one or more computer programs is executable by one or more processors, to implement at least one of: steps of the power determination method described above, steps of the signal transmission method described above, or steps of the power determination method described above.

DETAILED DESCRIPTION

Figure 1:
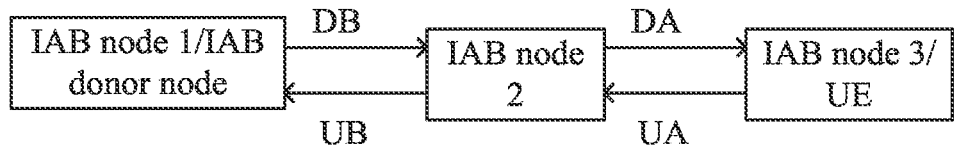
FIG. 1 is a schematic diagram of an IAB communication system.
Figure 2:
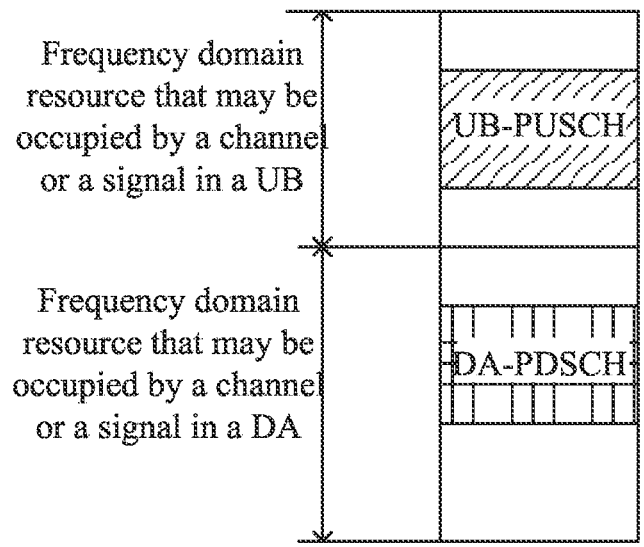
FIG. 2 is a schematic diagram of frequency division multiplexing of a UB channel or signal and a DA channel or signal in an embodiment of the present application.
Figure 3:
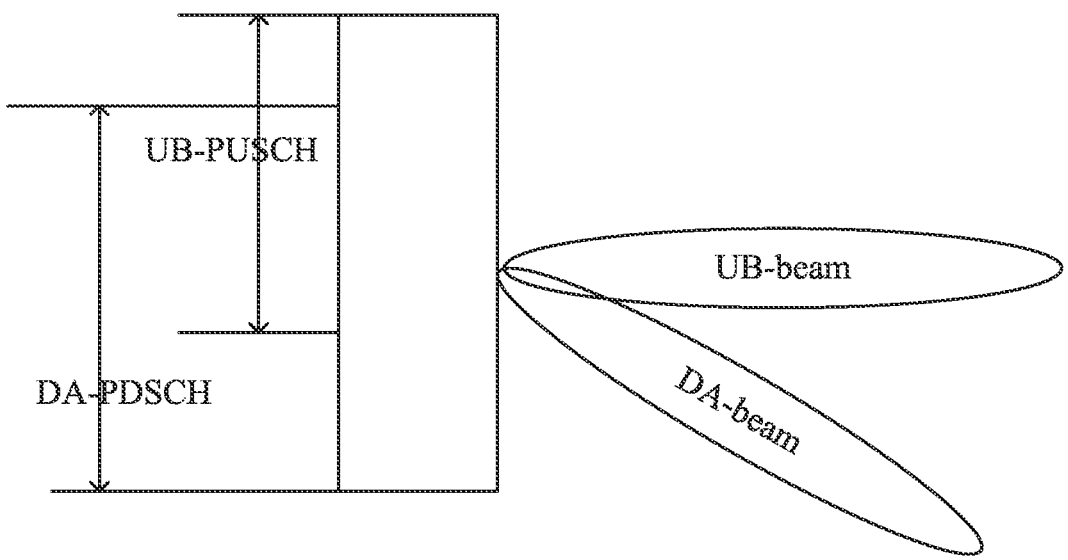
FIG. 3 is a schematic diagram of spatial division multiplexing of a UB channel or signal and a DA channel or signal in an embodiment of the present application.

The frequency division multiplexing of the UB link and the DA link in FIG. 1 is shown in FIG. 2, or the spatial division multiplexing of the UB link and the DA link in FIG. 1 is shown in FIG. 3, frequency domain resources occupied by the UB and the DA in FIG. 3 at the same time are partially overlapped, in this embodiment, and the complete overlapping of the frequency domain resources occupied by the UB and the DA at the same time is not excluded when the UB and the DA are subjected to the spatial division multiplexing. Especially when multiple beams of frequency domain multiplexing or spatial division multiplexing share one power amplifier, a power sharing problem between two links needs to be considered, for example, in FIG. 2 or FIG. 3, transmission power of the UB needs to be affected by transmission power of the DA link. Even if the power amplifier is not shared, the influence between the transmission power of the UB and the transmission power of the DA needs to be considered when there is a limit on a total power of the signal emitted at the IAB in FIG. 1, for example, a total power emitted by the UB and the DA from the IAB node 2 may not exceed a preset threshold.

On the other hand, even if two paths of signals of spatial division multiplexing or frequency division multiplexing do not share power, the total power is not limited, for example, the UB and the DA respectively correspond to two independent power amplifiers of the IAB node 2, but if transmission power of two spatial division multiplexing links are not equal, an interference problem may be caused, as shown in FIG. 3 and FIG. 1, when the UB and the DA are subjected to spatial division multiplexing, if the transmission power of the UB is far less than the transmission power of the DA, then the interference of the DA on a UB signal at the IAB donor node/IAB node 1 is relatively large. Similarly, if the transmission power of the UB is greater than the transmission power of the DA, then the UB signal causes relatively large interference on the DA signal at the IAB node 3/UE. During a frequency division multiplexing of the UB and the DA, although the frequency division multiplexing of the UB and the DA occupy different physical resource blocks, if a power difference of two signals is large, a power leakage of the signal with large power may cause strong interference to the other link.

Power information of the uplink is generally power control information sent to a terminal by a base station, or a value range calculation formula of specific power information is appointed by the base station and the terminal, a value obtained by the terminal in this range is reasonable, and when a reporting condition is satisfied, the terminal reports a finally selected power information value to the base station. That is to say, the IAB donor node/IAB node 1 in FIG. 1 transmits power control information to the IAB node 2, and it may be seen by referring to the protocol 38.213 and the protocol 38.331 that the power control information of an uplink channel allocated by the base station to the terminal includes: target receiving power $P_{O\_PUSCH,b,f,c}(j)$, a path loss adjustment factor $\alpha_{b,f,c}(j)$, downlink reference signal information $q_d$ referenced for calculating the path loss, a power adjustment parameter $\delta_{PUSCH,b,f,c}$ and a power process l of a $j_{th}$ set of power parameters in a bandwidth part b in a carrier f in a serving cell c. Multiple sets of power control information are needed, mainly because uplink transmission power control parameters should be different due to different beam combinations used by the uplink channel. In an embodiment, the transmission power of the PUSCH is acquired according to formula (1).

$$P_{PUSCH,b,f,c}(i, j, q_d, l) = \min\begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases}$$

Where, $\Delta_{TF,b,f,c}(i) = 10 \log_{10}((2^{BPRE \cdot K_s} - 1) \cdot \beta_{offset}^{PUSCH})$ for $K_s = 1.25$, and $\Delta_{T,b,f,c}(i) = 0$ for $K_s = 0$.
Where, for an uplink data channel PUSCH, $$BPRE = \sum_{r=0}^{C-1} K_r / N_{RE},$$

where C is a number of code blocks, $K_r$ is a number of bits included in each code block, and when the PUSCH only has uplink channel state information (CSI), $BPRE = O_{CSI}/N_{RE}$. Where, $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j),$$

$N_{symb,b,f,c}^{PUSCH}(i)$ is a number of time domain symbols included in the $i_{th}$ PUSCH transmission, $N_{sc,data}^{RB}(i,j)$ a number of remaining REs in a physical resource block (PRB) in the $j_{th}$ time domain symbol in the $i_{th}$ PUSCH transmission after the demodulation reference signal is removed, and the significance of other parameters may be referred to the protocol 38.213.

The base station and the terminal agree on the satisfaction of $P_{CMAX,f,c}(i)$ of the formula (1), as shown in formula (2) below:

$$P_{CMAX\_L,f,c} \leq P_{CMAX,f,c} \leq P_{CMAX\_H,f,c} \quad (2)$$

Where, $P_{CMAX\_L,f,c} = \text{MIN}\{P_{EMAX,c} - \Delta T_{C,c}, (P_{PowerClass} - \Delta P_{PowerClass}) - \text{MAX}(MPR_c + A\text{-}MPR_c + \Delta T_{IB,c} + \Delta_{TC,c}, P\text{-}MPR_c)\}$ (3-1)

$P_{CMAX\_H,f,c} = \text{MIN}\{P_{EMAX,c}, P_{PowerClass} - \Delta P_{PowerClass}\}$ (3-2)

The meaning of the multiple parameters may refer to a protocol 38.101-1. As long as $P_{CMAX,f,c}(i)$ satisfies the range in the formula (2), a value of $P_{CMAX,f,c}(i)$ depends on terminal selection, and when a triggering condition is satisfied, the terminal reports the selected value of $P_{CMAX,f,c}(i)$ to the base station.

On the other hand, when the triggering condition is satisfied, the terminal reports power headroom information to the base station, and the power headroom information may adopt one of following formulas (3-3)~(3-6).

$$PH_{type1,b,f,c}(i,j,q_d,l) = P_{CMAX,f,c}(i) - \{P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,f,c}(i) + f_{b,f,c}(i,l)\} \quad (3\text{-}3)$$

$$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\} \quad (3\text{-}4)$$

$$PH_{type3,b,f,c}(i,q_s) = P_{CMAX,f,c}(i) - \{P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i)\} \quad (3\text{-}5)$$

$$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{f,c}(i)\} \quad (3\text{-}6)$$

The meanings of the multiple parameters may refer to the protocol 38.213 and the protocol 38.101-1.

Embodiment One

Figure 4:
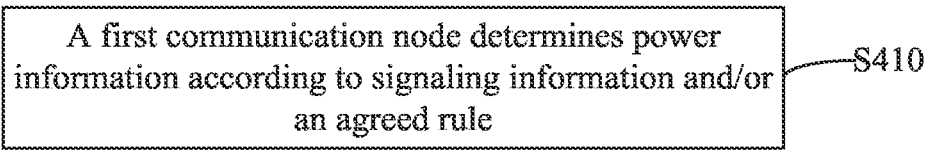
FIG. 4 is a flowchart of a power determination method in embodiment one of the present application.

This embodiment provides a power determination method. Please refer to FIG. 4, the power determination method includes: S410.

In S410, a first communication node determines power information according to received signaling information and/or an agreed rule, where the power information includes at least one of: first-type power information associated with a first-type channel or signal, second-type power information associated with a second-type channel or signal, or third-type power information associated with the first-type channel or signal; where an acquisition parameter of the first-type power information includes the second-type power information, and an acquisition parameter of the third-type power information do not include the second-type power information; and the first-type channel or signal is a channel or a signal between the first communication node and a second communication node, and the second-type channel or signal is a channel or a signal between the first communication node and one or more third communication nodes.

In some embodiments, the first-type channel or signal is a channel or a signal transmitted by the first communication node to the second communication node; and/or the second-type channel or signal is a channel or a signal transmitted by the first communication node to the third communication node.

In some embodiments, the determined power information includes at least one of: transmission power of the second-type channel or signal, receiving power of the second-type channel or signal, a difference value between the receiving power of the second-type channel or signal and receiving power of the first-type channel or signal, or a difference value between the transmission power of the second-type channel or signal and transmission power of the first-type channel or signal, and where the receiving power includes actual receiving power and/or target receiving power. The target receiving power is receiving power of the channel or the signal pre-negotiated by two communication ends of the channel or the signal through the signaling information or the agreed rule; while the actual receiving power represents power of the channel or the signal obtained by a receiving end through measurement after the channel or the signal reaches the receiving end. In an embodiment, for example, the difference value between the receiving power of the second-type channel or signal and the receiving power of the first-type channel or signal includes at least one of: a difference value between target receiving power of the UB at the IAB donor/IAB node 1 and target receiving power of the DA at the IAB node 3 in FIG. 1; a difference value between the target receiving power of the UB at the IAB donor/IAB node 1 and actual receiving power of the DA at the IAB node 3 in FIG. 1; a difference value between actual receiving power of the UB at the IAB donor/IAB node 1 and the target receiving power of the DA at the IAB node 3 in FIG. 1; a difference value between actual receiving power of the UB at the IAB donor/IAB node1 and the actual receiving power of the DA at the IAB node3 in FIG. 1; a difference value between the target receiving power of the UB at the IAB donor/IAB node1 and the target receiving power of the DA at the IAB donor/IAB node1 in FIG. 1; a difference value between the actual receiving power of the UB at the IAB donor/IAB node1 and the actual receiving power of the DA at the IAB donor/IAB node in FIG. 1; a difference value between target receiving power of the UB at the IAB node3/UE and target receiving power of the DA at the IAB node3/UE in FIG. 1; a difference value between actual receiving power of the UB at the IAB node3/UE and actual receiving power of the DA at the IAB node3/UE in FIG. 1.

In some embodiments, the acquisition parameter of the first-type power information may further include at least one of: frequency domain resource information corresponding to the second-type channel or signal, time domain resource information corresponding to the second-type channel or signal, space domain resource information corresponding to the second-type channel or signal, quasi co-located reference signal information of the second-type channel or signal, sub-carrier spacing information of the second-type channel or signal, or relationship information between a sub-carrier spacing of the first-type channel or signal and a sub-carrier spacing of the second-type channel or signal. The space domain resource information of one channel or signal represents channel large-scale information and spatial filter parameter information of this channel or signal, one space domain resource information is represented by a reference signal associated with this channel or signal, and a spatial filter parameter of the channel or the signal is obtained according to the reference signal; where the spatial filter parameter includes a spatial transmitting filter parameter and/or a spatial receiving filter parameter.

In some embodiments, the acquisition parameter of the first-type power information includes the second-type power information, and in a case where a sum of power of the first-type channel or signal and power of the second-type channel or signal exceeds a preset value, the method further includes at least one of: a sum value of a first product and a second product does not exceed a preset threshold, where the first product is a product of the first-type power information of the first-type channel or signal and a first power scaling factor, and the second product is a product of the first-type power information of the first-type channel or signal and a second power scaling factor; the power of the first-type channel or signal is reduced; the power of the second-type channel or signal is reduced; or a power priority of the first-type channel or signal and the second-type channel or signal is determined according to the signaling information or the agreed rule. The power priority indicates that transmission power of the channel or the signal with a higher power priority should be guaranteed preferentially, and/or a power reduction degree of the channel or the signal with a higher power priority is smaller.

In some embodiments, the method satisfies at least one of: the first-type channel includes at least one channel; the first-type signal includes at least one signal; the second-type channel includes at least one channel; the second-type signal includes at least one signal; a first preset threshold is obtained according to the received signaling information or the agreed rule; a second preset threshold is obtained according to the received signaling information or the agreed rule; the first power scaling factor is a rational number greater than or equal to 0 and less than or equal to 1; the second power scaling factor is a rational number greater than or equal to 0 and less than or equal to 1; where the step in which the power of the first-type channel or signal is reduced includes: a reduction factor of power of a control channel in the first-type channel is controlled to be greater than a power reduction factor of a data channel in the first-type channel; where the power reduction factor indicates that the reduction factor is the larger, the reduction degree of the power is the smaller. The step in which the power of the second-type channel or signal is reduced includes: a reduction factor of power of a control channel in the second-type channel is controlled to be greater than the power reduction factor of the data channel in the first-type channel; where the step in which the power of the first-type channel or signal is reduced includes: reduction factors of different channel types of power in the first-type channel are controlled to be different; where the step in which the power of the first-type channel or signal is reduced includes: reduction factors of different signal types of power in the first-type signal are controlled to be different; where the step in which the power of the first-type channel or signal is reduced includes: reduction factors of different channel types of power in the second-type channel are controlled to be different; or where the step in which the power of the first-type channel or signal is reduced includes: reduction factors of different signal types of power in the second-type signal are controlled to be different.

In some embodiments, the first-type channel or signal is a channel or a signal transmitted by the second communication node to the first communication node, that is, a channel or a signal received by the first communication node from the second communication node; and/or the second-type channel or signal is a channel or a signal transmitted by the third communication node to the first communication node, that is, a channel or a signal received by the first communication node from the third communication node.

In some embodiments, the determined power information further includes at least one of: transmission power of the first-type channel or signal transmitted by the second communication node; receiving power of the first-type channel or signal received by the first communication node; a difference value between the receiving power of the first-type channel or signal received by the first communication node and receiving power of the second-type channel or signal received by the first communication node; a difference value between the receiving power of the first-type channel or signal received by the first communication node and target receiving power of the first-type channel or signal received by the first communication node; or one or more parameters of transmission power acquisition parameters of the second-type channel or signal; where the receiving power includes actual receiving power and/or target receiving power.

In some embodiments, the step in which the first communication node determines the power information according to the agreed rule includes: in a case where the second-type channel or signal exists on a time resource where the first-type channel or signal is located, the determined power information includes the first-type power information; and/or in a case where the second-type channel or signal does not exist on the time resource where the first-type channel or signal is located, the determined power information includes the third-type power information.

In some embodiments, the step in which the first communication node determines the power information according to the agreed rule may further include: in a case where an intersection between a time domain resource occupied by the first-type channel or signal and a time domain resource occupied by the second-type channel or signal is non-empty, the determined power information includes the first-type power information; and/or in a case where the intersection between the time domain resource occupied by the first-type channel or signal and the time domain resource occupied by the second-type channel or signal is empty, the determined power information includes the third-type power information.

In some embodiments, multiple time domain symbols occupied by the first-type channel or signal include C1 time domain symbol sets, where the C1 time domain symbol sets satisfy at least one of following features: the C1 time domain symbol sets include a first time domain symbol set and a second time domain symbol set, and an intersection between the first time domain symbol set and the second time domain symbol set is an empty set; an intersection between any two time domain symbol sets of the C1 time domain symbol sets is an empty set; power information of the first-type channel or signal on multiple time domain symbols included in one time domain symbol set is the same; the second-type power information included in the acquisition parameter of the first-type power information of the first-type channel or signal on multiple time domain symbols included in one time domain symbol set is the same; the second-type power information included in the acquisition parameter of the first-type power information of the first-type channel or signal on multiple time domain symbols included in one time domain symbol set is obtained according to multiple power values of the second-type channel or signal in the multiple time domain symbols in the time domain symbol sets and according to the agreed rule; each time domain symbol set of the C1 time domain symbol sets is associated with a set of power information of the first-type channel or signal; each time domain symbol set of the C1 time domain symbol sets is associated with a set of values of the second-type power information in first-type channel or signal acquisition parameters; the C1 time domain symbol sets are associated with C1 sets of power information of the first-type channel or signal; each time domain symbol set of the C1 time domain symbol sets is associated with C1 sets of values of the second-type power information in the first-type channel or signal acquisition parameters; a division of the time domain symbol sets is determined according to the second-type power information; a division of the time domain symbol sets is determined according to power information of the second-type channel or signal on the multiple time domain symbols occupied by the first-type channel or signal; an intersection between different time domain symbol sets is non-empty; the C1 time domain symbol sets belong to one time unit; the C1 time domain symbol sets belong to Y time units, where the Y time units are Y time units occupied by the first-type channel or signal scheduled by one piece of signaling information; or a division of the time domain symbol sets is determined according to the agreed rule or the received signaling information; where C1 is a positive integer greater than or equal to 1.

In some embodiments, power information on the multiple time domain symbols occupied by the first-type channel or signal is the same; and/or on multiple time domain symbols occupied by the first-type channel or signal and including the second-type channel or signal, the determined power information includes the first-type power information, where on the multiple time domain symbols, the second-type power information included in the acquisition parameter of the first-type power information is the same.

In some embodiments, when the first-type channel or signal occupies at least two time domain symbols, the method satisfies at least one of: if the at least two time domain symbols exist on a time domain symbol of the second-type channel or signal, then the determined power information includes the first-type power information; if the at least two time domain symbols do not exist on the time domain symbol of the second-type channel or signal, then the determined power information includes the third-type power information; in different time domain symbols of the at least two time domain symbols, the power information of the first-type channel or signal is different; if the at least two time domain symbols exist in each time domain symbol of the second-type channel or signal, then the first-type power information of the first-type channel or signal is obtained according to the second-type power information of the second-type channel or signal in this time domain symbol; the power information of the first-type channel or signal is different in the at least two time domain symbols.

In some embodiments, when the first communication node determines, according to the agreed rule, that the power information includes the second-type power information: if the first-type channel or signal exists on a time resource where the second-type channel or signal is located, then the acquisition parameter of the second-type power information includes power information associated with the first channel or signal; and/or if the first-type channel or signal does not exist on the time resource where the second-type channel or signal is located, then the acquisition parameter of the second-type power information does not include the power information associated with the first channel or signal.

In some embodiments, a power information type included in the determined power information is associated with at least one of following information: multiplexing manner information of the first-type channel or signal and the second-type channel or signal; an intersection between a frequency domain set occupied by the first-type channel or signal and a frequency domain set occupied by the second-type channel or signal; whether the first-type channel or signal and the second-type channel or signal fall in a same time unit; information on whether the first-type channel or signal shares power with the second-type channel or signal at the first communication node; a relationship between a carrier frequency where the first-type channel or signal is located and a preset value; a relationship between a carrier frequency where the second-type channel or signal is located and the preset value; whether a quasi co-located reference signal associated with a spatial receiving filter parameter exists in all quasi co-located reference signals associated with the first-type channel or signal; whether a quasi co-located reference signal associated with the spatial receiving filter parameter exists in all quasi co-located reference signals associated with the second-type channel or signal; whether a sum of transmission power of the first-type channel or signal and transmission power of the second-type channel or signal needs to be less than a first preset value; whether a sum of receiving power of the first-type channel or signal and receiving power of the second-type channel or signal needs to be less than a second preset value; whether a component carrier where the first-type channel or signal is located and a component carrier, CC, where the second-type channel or signal is located belong to one frequency band; one frequency band may include multiple component carriers (CC), frequency domain resources included in one frequency band are continuous, frequency domain resources included in different frequency bands are discontinuous, a general terminal may receive channel or signal in one frequency band by adopting one power amplifier and receive channel or signal in different frequency bands through different power amplifiers, and the frequency domain resources included in the other frequency band are discontinuous. Different CCs belonging to one frequency band are referred to as CCs of intra-band, and different CCs belonging to different frequency bands are referred to as CCs of inter-band; whether the first-type channel or signal is configured with spatial transmission filter parameter information; or whether the second-type channel or signal is configured with the spatial transmission filter parameter information. In various embodiments of the present application, two pieces of information have an associated representation that one piece of information may be derived from the other piece of information, and/or that some specific combined values of one piece of information and the other piece of information may_not occur at the same time.

In some embodiments, when the multiplexing manner is time division multiplexing, the determined power information includes the third-type power information; and/or when the multiplexing manner is frequency division multiplexing and/or spatial division multiplexing, the determined power information includes at least one of following power information: the first-type power information, the second-type power information or the third-type power information.

In some embodiments, the method may further include at least one of: the first communication node reports or requests the determined power information to the second communication node; the first communication node transmits the first-type channel or signal according to the determined power information; the first communication node receives the first-type channel or signal according to the determined power information; the first communication node transmits the second-type channel or signal according to the determined power information; or the first communication node receives the second-type channel or signal according to the determined power information.

In some embodiments, scheduling information of the first-type channel or signal is transmitted to the first communication node by the second communication node; and/or scheduling information of the second-type channel or signal is transmitted to the third communication node by the first communication node.

In some embodiments, the determined power information includes P sets of values of same-type power information, and the P sets of values respectively correspond to P channels, or P signals, or P frequency domain bandwidths, or P time domain resource sets, or P reference signal combinations; where one frequency domain bandwidth may be one band, one CC, or one bandwidth part (BWP); where one reference signal combination means a combination of multiple reference signals corresponding to multiple links; and/or the first communication node transmits report information or request information to the second communication node, where the report information or the request information includes the determined power information and at least one of following indexes corresponding to the determined power information: a channel index, a signal index, a frequency domain bandwidth index, a time domain resource set index or a reference signal combination index.

In some embodiments, the method satisfies at least one of: the first-type channel or signal and the second-type channel or signal fall in a same time unit; where the same time unit may refer to one orthogonal frequency division multiplexing (OFDM) symbol, or one time domain symbol, or it may be a slot, or a sub-frame, etc.; the time domain resource occupied by the first-type channel or signal is overlapped with the time domain resource occupied by the second-type channel or signal; the first-type channel or signal and the second-type channel or signal are subjected to frequency division multiplexing; the first-type channel or signal and the second-type channel or signal are channel or signal transmitted by the first communication node; the first-type channel or signal and the second-type channel or signal are channel or signal received by the first communication node; the first-type channel or signal and the second-type channel or signal fall in one frequency band; the first-type channel or signal and the second-type channel or signal share power of the first communication node; the sum of the transmission power of the first-type channel or signal and the transmission power of the second-type channel or signal does not exceed a first preset threshold; the sum of the receiving power of the first-type channel or signal and the receiving power of the second-type channel or signal does not exceed a second preset threshold; the carrier frequency where the first-type channel or signal is located is less than the preset value; the carrier frequency where the second-type channel or signal is located is less than the preset value; no quasi co-located reference signal associated with the spatial receiving filter parameter exist in the all quasi co-located reference signals associated with the first-type channel or signal; no quasi co-located reference signal associated with the spatial receiving filter parameter exists in the all quasi co-located reference signals associated with the second-type channel or signal; the first-type channel or signal is not configured with the spatial transmission filter parameter information; or the second-type channel or signal is not configured with the spatial transmission filter parameter information.

In some embodiments, the frequency domain resource occupied by the first-type channel or signal includes X physical resource block groups, second-type power information values in the acquisition parameter of the first-type power information in each of the X physical resource block groups are the same, one of the X physical resource block groups includes one or more physical resource blocks, and X is a positive integer. Further, the second-type power information in the acquisition parameter of the first-type power information in different physical resource block groups may be different.

In some embodiments, the second-type power information in the acquisition parameter of the first-type power information in one of the X physical resource block groups is power information satisfying a preset feature in multiple pieces of power information of the second channel or signal associated with the physical resource blocks included in the one of theX physical resource block groups; where the preset feature is a maximum value or a minimum value among multiple powers, or power of DA in a preset PRB, such as power of DA in the lowest PRB resource block; the second-type power information in the acquisition parameter of the first-type power information in one of the X physical resource block groups is an average value of multiple pieces of power information of the second channel or signal associated with the physical resource blocks included in the one of the X physical resource block groups; a division of the physical resource block groups is the same on different time domain symbol resource sets occupied by the first-type channel or signal; continuous physical resource blocks occupied by the first-type channel or signal belong to one physical resource block group; discontinuous physical resource blocks occupied by the first-type channel or signal belong to different physical resource block groups; the division of the physical resource block groups is determined according to the received signaling information; the physical resource block groups are associated with precoding resource group information of the first-type channel or signal; or an intersection between different physical resource block groups is empty.

In some embodiments, the first-type power information includes at least one of: maximum power, a power headroom, target receiving power, transmission power, receiving power, an acquisition parameter of the transmission power, or an acquisition parameter of the receiving power; and/or the second-type power information includes at least one of: maximum power, a power headroom, target receiving power, transmission power, receiving power, an acquisition parameter of the transmission power, or an acquisition parameter of the receiving power; and/or the third-type power information includes at least one of: maximum power, a power headroom, target receiving power, transmission power, receiving power, an acquisition parameter of the transmission power, or an acquisition parameter of the receiving power.

In some embodiments, the method may further includes at least one of: the first communication node feeds back first information to the second communication node, and/or the signaling information includes the first information; where the first information includes at least one of: information on whether the first-type channel or signal shares power with the second-type channel or signal at the first communication node; multiplexing manner information of the first-type channel or signal and the second-type channel or signal; whether the sum of the transmission power of the first-type channel or signal and the transmission power of the second-type channel or signal needs to be less than the first preset value; whether the sum of the receiving power of the first-type channel or signal and the receiving power of the second-type channel or signal needs to be less than the second preset value; whether the component carrier where the first-type channel or signal is located and the CC where the second-type channel or signal is located belong to one frequency band; the relationship between the carrier frequency where the second-type channel or signal is located and the preset value; whether the quasi co-located reference signal associated with the spatial receiving filter parameter exists in the all quasi co-located reference signals associated with the second-type channel or signal; or whether the second-type channel or signal is configured with the spatial transmission filter parameter information.

According to the power determination method provided in the embodiments of the present application, the first communication node determines the power information according to the signaling information and/or the agreed rule, and the power information includes at least one of: the first-type power information associated with the first-type channel or signal, the second-type power information associated with the second-type channel or signal, or the third-type power information associated with the first-type channel or signal; where the acquisition parameter of the first-type power information includes the second-type power information, and the acquisition parameter of the third-type power information do not include the second-type power information; and where the first-type channel or signal is the channel or the signal between the first communication node and the second communication node, and the second-type channel or signal is the channel or the signal between the first communication node and the one or more third communication nodes. Through the above methods, a correlation between powers of multiple signals simultaneously transmitted by a same communication node may be effectively realized, and/or a correlation between powers of multiple signals simultaneously received by a same communication node is realized, so that the technical effects of satisfying the power limitation requirement and/or reducing interference are achieved.

Embodiment Two

Figure 5:
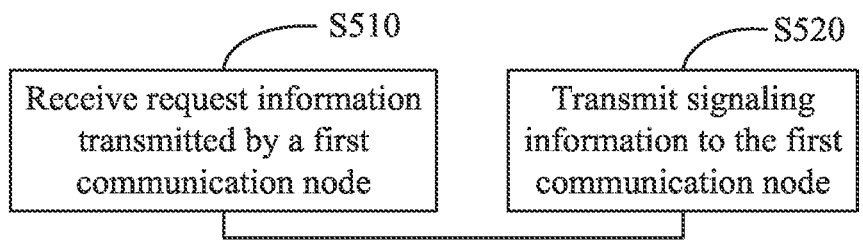
FIG. 5 is a flowchart of a power determination method in embodiment two of the present application.

This embodiment provides a power determination method. Please refer to FIG. 5, the power determination method includes: S510 and/or S520.

In S510, a second communication node receives request information transmitted by a first communication node.

In S520, the second communication node transmits signaling information to the first communication node.

At least one of the request information or the signaling information includes at least one of: first-type power information associated with a first-type channel or signal, second-type power information associated with a second-type channel or signal, or third-type power information associated with the first-type channel or signal; an acquisition parameter of the first-type power information includes the second-type power information, and an acquisition parameter of the third-type power information do not include the second-type power information; and the first-type channel or signal is a channel or a signal between the first communication node and the second communication node, and the second-type channel or signal is a channel or a signal between the first communication node and one or more third communication nodes.

In this embodiment, the signaling information is used for the first communication node to determine the power information according to the signaling information, representing that the signaling information includes the determined power information, and/or representing that the signaling information includes an acquisition parameter of the determined power information.

In some embodiments, the first-type channel or signal is a channel or a signal transmitted by the first communication node to the second communication node; and/or the second-type channel or signal is a channel or a signal transmitted by the first communication node to the third communication node.

In some embodiments, the signaling information and/or the request information may include at least one of: transmission power of the second-type channel or signal, receiving power of the second-type channel or signal, a difference value between the receiving power of the second-type channel or signal and receiving power of the first-type channel or signal, a difference value between the transmission power of the second-type channel or signal and transmission power of the first-type channel or signal, or selection information acquired by power information of the first-type channel or signal according to the first-type power information or the third-type power information; and where the receiving power includes actual receiving power and/or target receiving power.

In some embodiments, the signaling information and/or the request information may further include at least one of following acquisition parameters of the first-type power information: frequency domain resource information corresponding to the second-type channel or signal, time domain resource information corresponding to the second-type channel or signal, space domain resource information corresponding to the second-type channel or signal, quasi co-located reference signal information of the second-type channel or signal, sub-carrier spacing information of the second-type channel or signal, or relationship information between a sub-carrier spacing of the first-type channel or signal and a sub-carrier spacing of the second-type channel or signal.

In some embodiments, the request information and/or the signaling information may include at least one of: a power priority between the power information of the first-type channel or signal and power information of the second-type channel or signal, a power scaling factor in the first-type channel or signal, a power scaling factor in the second-type channel or signal, multiple power scaling factors corresponding to multiple channel or signal included in the first-type channel or signal, or multiple power scaling factors corresponding to multiple channel or signal included in the second-type channel or signal; when a sum of power of the first-type channel or signal and power of the second-type channel or signal exceeds a preset value, the power scaling factor satisfies at least one of: the power scaling factor of the first-type channel or signal is determined according to the power priority; the power scaling factor of the second-type channel or signal is determined according to the power priority; the first-type channel or signal is subjected to power scaling according to the power scaling factor in the first-type channel or signal; the second-type channel or signal is subjected to the power scaling according to the power scaling factor in the second-type channel or signal; the first-type channel or signal is subjected to the power scaling according to the power scaling factor in the first-type channel or signal; the multiple channel or signal included in the first-type channel or signal are subjected to the power scaling according to a power scaling factor corresponding to each channel or signal; or the multiple channel or signal included in the second-type channel or signal are subjected to the power scaling according to the power scaling factor corresponding to each channel or signal.

In some embodiments, the first-type channel or signal is a channel or a signal received by the first communication node from the second communication node; and/or the second-type channel or signal is a channel or a signal received by the first communication node from the third communication node.

In some embodiments, the signaling information and/or the request information may include at least one of: transmission power of the first-type channel or signal transmitted by the second communication node; receiving power of the first-type channel or signal received by the first communication node; a difference value between the receiving power of the first-type channel or signal received by the first communication node and receiving power of the second-type channel or signal received by the first communication node; one or more parameters of transmission power acquisition parameters of the second-type channel or signal; or selection information acquired by the power information of the first-type channel or signal according to the first-type power information or the third-type power information; where the receiving power includes actual receiving power and/or target receiving power.

In some embodiments, the signaling information and/or the request information includes: a corresponding relationship between C1 time domain symbol sets and C1 sets of power information of the first-type channel or signal; and/or a division condition of the C1 time domain symbol sets; where multiple time domain symbols occupied by the first-type channel or signal includes the C1 time domain symbol sets, and the C1 time domain symbol sets satisfy at least one of following features: the C1 time domain symbol sets include a first time domain symbol set and a second time domain symbol set, and an intersection between the first time domain symbol set and the second time domain symbol set is an empty set; an intersection between any two time domain symbol sets in the C1 time domain symbol sets is an empty set; power information of the first-type channel or signal on multiple time domain symbols included in one time domain symbol set is the same; the second-type power information included in the acquisition parameter of the first-type power information of the first-type channel or signal on multiple time domain symbols included in one time domain symbol set is the same; the second-type power information included in the acquisition parameter of the first-type power information of the first-type channel or signal on multiple time domain symbols included in one time domain symbol set is obtained according to multiple power values of the second-type channel or signal in the multiple of time domain symbols in the time domain symbol set and the agreed rule; each time domain symbol set of the C1 time domain symbol sets is associated with a set of power information of the first-type channel or signal; each time domain symbol set of the C1 time domain symbol sets is associated with a set of values of the second-type power information in first-type channel or signal acquisition parameters; the C1 time domain symbol sets are associated with C1 sets of power information of the first-type channel or signal; each time domain symbol set of the C1 time domain symbol sets is associated with C1 sets of values of the second-type power information in the first-type channel or signal acquisition parameters; a division of the time domain symbol sets is determined according to the second-type power information; a division of the time domain symbol sets is determined according to power information of the second-type channel or signal on the multiple of time domain symbols occupied by the first-type channel or signal; the C1 time domain symbol sets belong to one time unit; the C1 time domain symbol sets belong to Y time units, where the Y time units are Y time units occupied by the first-type channel or signal scheduled by one piece of signaling information; or a division of the time domain symbol sets is determined according to the signaling information; where C1 is a positive integer greater than or equal to 1.

In some embodiments, the method may further include at least one of: the second communication node transmits the first-type channel or signal according to the determined power information; the second communication node receives the first-type channel or signal according to the determined power information; the second communication node transmits the second-type channel or signal according to the determined power information; or the second communication node receives the second-type channel or signal according to the determined power information; where the determined power information is obtained by the second communication node according to the request information and/or the signaling information.

In some embodiments, the signaling information includes P sets of values of same-type power information, and the P sets of values respectively correspond to P channels, or P signals, or P frequency domain bandwidths, or P time domain resource sets, or P reference signal combinations; and/or the second communication node receives report information or request information transmitted by the first communication node, where the report information or the request information includes the power information and at least one of following indexes corresponding to the power information: a channel index, a signal index, a frequency domain bandwidth index, a time domain resource set index or a reference signal combination index.

In some embodiments, the method satisfies at least one of: the first-type channel or signal and the second-type channel or signal fall in a same time unit; the time domain resource occupied by the first-type channel or signal is overlapped with the time domain resource occupied by the second-type channel or signal; the first-type channel or signal and the second-type channel or signal are subjected to frequency division multiplexing; the first-type channel or signal and the second-type channel or signal are channel or signal transmitted by the first communication node; the first-type channel or signal and the second-type channel or signal are channel or signal received by the first communication node; the first-type channel or signal and the second-type channel or signal fall in one frequency band; the first-type channel or signal and the second-type channel or signal share power of the first communication node; the sum of the transmission power of the first-type channel or signal and the transmission power of the second-type channel or signal does not exceed a first preset threshold; the sum of the receiving power of the first-type channel or signal and the receiving power of the second-type channel or signal does not exceed a second preset threshold; the carrier frequency where the first-type channel or signal is located is less than the preset value; the carrier frequency where the second-type channel or signal is located is less than the preset value; no quasi co-located reference signal associated with the spatial receiving filter parameter exist in the all quasi co-located reference signals associated with the first-type channel or signal; no quasi co-located reference signal associated with the spatial receiving filter parameter exists in the all quasi co-located reference signals associated with the second-type channel or signal; the first-type channel or signal is not configured with the spatial transmission filter parameter information; or the second-type channel or signal is not configured with the spatial transmission filter parameter information.

In some embodiments, the request information and/or the signaling information includes X pieces of physical resource block group information, the frequency domain resource occupied by the first-type channel or signal includes X physical resource block groups, second-type power information values in the acquisition parameter of the first-type power information in each of the X physical resource block groups are the same, one of the X physical resource block groups includes one or more physical resource blocks, and X is a positive integer.

In some embodiments, the method satisfies at least one of: the second-type power information in the acquisition parameter of the first-type power information in one of the X physical resource block groups is power information satisfying a preset feature in multiple pieces of power information of the second channel or signal associated with the physical resource blocks included in the one of the X physical resource block groups; where the preset feature is a maximum value, or a minimum value, of multiple power, or power of DA in preset PRB, such as power of DA in lowest PRB resource block; the second-type power information in the acquisition parameter of the first-type power information in one of the X physical resource block groups is an average value of multiple pieces of power information of the second channel or signal associated with the physical resource blocks included in the one of the X physical resource block groups; a division of the physical resource block groups is the same on different time domain symbol resource sets occupied by the first-type channel or signal; continuous physical resource blocks occupied by the first-type channel or signal belong to one physical resource block group; discontinuous physical resource blocks occupied by the first-type channel or signal belong to different physical resource block groups; the division of the physical resource block groups is determined according to the received signaling information; the physical resource block groups are associated with precoding resource group information of the first-type channel or signal; or an intersection between different physical resource block groups is empty.

In some embodiments, the first-type power information includes at least one of: maximum power, a power headroom, target receiving power, transmission power, receiving power, an acquisition parameter of the transmission power, or an acquisition parameter of the receiving power; and/or the second-type power information includes at least one of: maximum power, a power headroom, target receiving power, transmission power, receiving power, an acquisition parameter of the transmission power, or an acquisition parameter of the receiving power; and/or the third-type power information includes at least one of: maximum power, a power headroom, target receiving power, transmission power, receiving power, an acquisition parameter of the transmission power, or an acquisition parameter of the receiving power.

In some embodiments, at least one of the request information or the signaling information may include at least one of: information on whether the first-type channel or signal shares power with the second-type channel or signal at the first communication node; multiplexing manner information of the first-type channel or signal and the second-type channel or signal; whether the sum of the transmission power of the first-type channel or signal and the transmission power of the second-type channel or signal needs to be less than the first preset value; whether the sum of the receiving power of the first-type channel or signal and the receiving power of the second-type channel or signal needs to be less than the second preset value; whether the component carrier where the first-type channel or signal is located and the CC where the second-type channel or signal is located belong to one frequency band; the relationship between the carrier frequency where the second-type channel or signal is located and the preset value; whether the quasi co-located reference signal associated with the spatial receiving filter parameter exists in the all quasi co-located reference signals associated with the second-type channel or signal; or whether the second-type channel or signal is configured with the spatial transmission filter parameter information.

Embodiment Three

Figure 6:
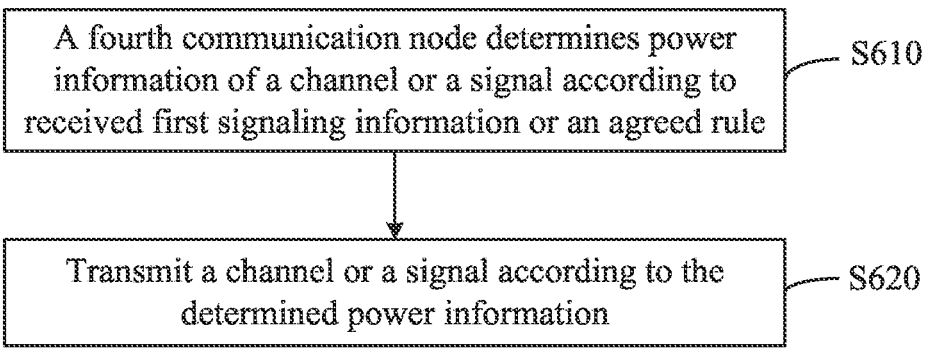
FIG. 6 is a flowchart of a signal transmission method in embodiment three of the present application.

This embodiment provides a power transmission method. Please refer to FIG. 6, the power transmission method includes: S610-S620.

In S610, a fourth communication node determines power information of a channel or a signal according to received first signaling information or an agreed rule.

In S620, the channel or the signal is transmitted according to the determined power information.

The fourth communication node in this embodiment may be a terminal, or IAB node 2 as shown in FIG. 1, etc., where the channel may also be referred to as a channel signal. Specifically, the fourth communication node represents that the fourth communication node is a managed node and plays a role of a terminal in one communication process.

In some embodiments, N time domain symbols occupied by the channel or the signal include C time domain symbol sets, each of the C time domain symbol sets is associated with a set of power information; where N is a positive integer larger than or equal to 1, and C is a positive integer less than or equal to N.

In some embodiments, the method satisfies at least one of: the C time domain symbol sets include a first time domain symbol set and a second time domain symbol set, and an intersection between the first time domain symbol set and the second time domain symbol set is an empty set; an intersection between any two time domain symbol sets in the C time domain symbol sets is an empty set; power information on multiple time domain symbols included in one time domain symbol set is the same, for example, power information on multiple time domain symbols included in one time domain symbol set is the same.

In some embodiments, the N time domain symbols occupied by the channel or the signal fall in one time unit; and/or the N time domain symbols occupied by the channel or the signal are scheduled by one control signaling.

In some embodiments, the first signaling information includes a set of power information associated with each time domain resource set of the C time domain symbol sets; and/or the C time domain symbol sets are associated with C sets of power information, where the C sets of power information are different configuration values for a same-type power parameter set.

In some embodiments, there is an association between the power information of the channel or the signal and at least one of following information: the first signaling information, request information transmitted by a fourth communication node, a multiplexing manner between A links, whether frequency domain resources occupied by the channel or the signal in the A links overlap, or a relationship between a sum of power of channel or signal in B links and a preset value, where A and B are positive integers greater than or equal to 1.

In some embodiments, the first signaling information includes a mapping relation between reference signal resource indication information and power information, where same reference signal resource indication information corresponds to one or more sets of power information; and/or the first signaling information includes a mapping relation between reference signal resource indication information and time advance, where same reference signal resource indication information corresponds to one or more sets of time advance information.

In some embodiments, the method satisfies at least one of: the fourth communication node receives second signaling information, where the second signaling information includes selection information in multiple sets of power information, and the selected power information serves as power information of a channel or a signal associated with the reference signal resource indication information; the multiple sets of power information associated with the reference signal resource indication information have a corresponding relationship with the multiple sets of time advance (TA) information associated with the reference signal resource indication information; the selection information of the reference signal resource indication information in the multiple sets of power information is associated with selection information of the reference signal resource indication information in the multiple sets of time advance (TA) information; where there is an association between two pieces of information herein, it is meant that one piece of information may be derived from another piece of information, and/or that some particular combined value of the two pieces of information may not occur at the same time; the selection information of the reference signal resource indication information in the multiple sets of power information has an association relationship with control channel resource information where control information for scheduling the reference signal resource indication information is located; the selection information of the reference signal resource indication information in the multiple sets of time advance (TA) information has an association relationship with the control channel resource information where the control information for scheduling the reference signal resource indication information is located; or the reference signal resource indication information includes resource indication information of one or more reference signals.

In some embodiments, the first signaling information is RRC signaling information, and the second signaling information is MAC-CE signaling information; and/or the first signaling information is the RRC signaling information, and the second signaling information is physical layer dynamic control information.

In some embodiments, the first signaling information includes an indicated value of the power information, where a mapping relation between an indicated value in the first signaling information and a power information value is determined according to a resource where the first signaling information is located; and/or the first signaling information includes the indicated value of the power information, where the mapping relation between the indicated value in the first signaling information and the power information value is determined according to a resource where the channel or the signal is located; where the resource includes at least one of a time domain resource, a frequency domain resource, a sequence resource or a space domain resource.

In some embodiments, the method may further include: the power information of the channel or the signal is determined according to a multiplexing manner between A links; where the channel or the signal belongs to at least one link of the A links.

In some embodiments, the power information includes at least one of: target receiving power, maximum transmission power, a power headroom, a reference signal for calculating path loss, a path loss adjustment factor, a power process, or a power adjustment amount.

According to the signal transmission method provided in this embodiment, the fourth communication node determines the power information of the channel or the signal according to the received first signaling information or the agreed rule; the channel or the signal is transmitted according to the determined power information. Considering that multiplexing manners among multiple links on different time domain symbols are different and/or occupied resource conditions of different links on different time domain symbols are different, channel or signal spatial division multiplexing on the multiple links at a same communication node is realized, and meanwhile, power reception of the multiple links satisfies a limit, and/or the technical effect of interference control is achieved.

Embodiment Four

Figure 7:
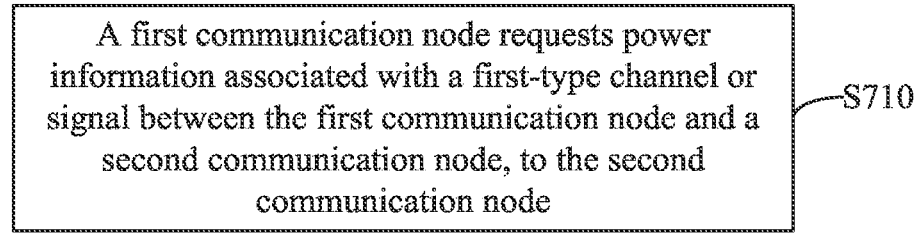
FIG. 7 is a flowchart of a power determination method in embodiment four of the present application.

This embodiment provides a power determination method. Please refer to FIG. 7, the power determination method includes: S710.

In S710, a first communication node requests or feeds back power information associated with a first-type channel or signal between the first communication node and a second communication node, to the second communication node.

In some embodiments, the first-type channel or signal is a downlink channel or signal; and/or the first-type channel or signal is a channel or a signal received by the first communication node from the second communication node.

In some embodiments, the power information may include at least one of: transmission power of the first-type channel or signal transmitted by the second communication node; receiving power of the first-type channel or signal received by the first communication node; a difference value between the receiving power of the first-type channel or signal received by the first communication node and receiving power of the second-type channel or signal received by the first communication node; or one or more parameters in transmission power acquisition parameters of the second-type channel or signal; where the receiving power includes actual receiving power and/or target receiving power, and the second-type channel or signal is a channel or a signal between the first communication node and one or more third communication nodes.

In some embodiments, the first-type channel or signal is a downlink channel or signal; and/or the first-type channel or signal is a channel or a signal transmitted by the first communication node to the second communication node.

In some embodiments, the first-type channel or signal is an uplink channel or signal; and/or the first-type channel or signal is a channel or a signal transmitted by the first communication node to the second communication node.

In some embodiments, the power information includes at least one of: transmission power of the first-type channel or signal; receiving power of the first-type channel or signal; a difference value between the receiving power of the first-type channel or signal and receiving power of the second-type channel or signal; or a difference value between the transmission power of the first-type channel or signal and transmission power of the second-type channel or signal; where the receiving power includes actual receiving power and/or target receiving power, and the second-type channel or signal is a channel or a signal transmitted by the first communication node to one or more third communication nodes.

In some embodiments, the power information includes at least one of maximum power, a power headroom, target receiving power, transmission power, receiving power, an acquisition parameter of the transmission power, or an acquisition parameter of the receiving power.

In some embodiments, scheduling information of the first-type channel or signal is transmitted to the first communication node by the second communication node.

In some embodiments, the method may further include: the first communication node requests or feeds back first information to the second communication node; where the first information includes at least one of: information on whether the first-type channel or signal shares power with the second-type channel or signal at the first communication node; multiplexing manner information of the first-type channel or signal and the second-type channel or signal; whether the sum of the transmission power of the first-type channel or signal and the transmission power of the second-type channel or signal needs to be less than the first preset value; whether the sum of the receiving power of the first-type channel or signal and the receiving power of the second-type channel or signal needs to be less than the second preset value; whether the component carrier where the first-type channel or signal is located and the CC where the second-type channel or signal is located belong to one frequency band; the relationship between the carrier frequency where the second-type channel or signal is located and the preset value; whether the quasi co-located reference signal associated with the spatial receiving filter parameter exists in the all quasi co-located reference signals associated with the second-type channel or signal; or whether the second-type channel or signal is configured with the spatial transmission filter parameter information; where the first-type channel or signal is a channel or a signal between the first communication node and the second communication node, and the second-type channel or signal is a channel or a signal between the second communication node and one or more third communication nodes.

According to the power determination method provided in this embodiment, the first communication node requests the power information associated with the first-type channel or signal between the first communication node and the second communication node, to the second communication node, so that the second communication node may schedule the signal through the request information. Therefore, a correlation between powers of multiple signals simultaneously transmitted by a same communication node may be effectively realized, and/or a correlation between powers of multiple signals simultaneously received by a same communication node is realized, so that the technical effects of satisfying the power limitation requirement and/or reducing interference are achieved.

The determination of associated power information with channels and signals between multiple communication nodes in some implementations may achieve technical effects including, but not limited to, better power control, and improved power utilization efficiency.

Application Embodiment One

In this embodiment, if a power control system of next generation radio (NR) continues to be used in an IAB system, then when IAB donor node/IAB node 1 allocates power information for UB-PUSCH, transmission power of the channel or the signal in the DA with the UB-physical uplink shared channel (PUSCH) frequency division multiplexing and/or spatial division multiplexing is not considered, for this purpose following enhancement schemes are possible.

Scheme one: an IAB node 2 in FIG. 1 requests or feeds back power information of the UB-PUSCH expected by the IAB node 2 to the IAB donor node/IAB node 1, where the request information transmitted by the IAB node 2 includes at least one of following information of UB-PUSCH/UB-PUCCH/UB-SRS: target power $P_{O\_PUSCH,b,f,c}(j)$, a path loss adjustment factor $\alpha_{b,f,c}(j)$, a downlink reference signal $q_d$ for calculating a path loss reference and a power adjustment parameter $\delta_{PUSCH,b,f,c}$. It needs to be noted in particular that the target power $P_{O\_PUSCH,b,f,c}(j)$ consists of two parts, i.e., $P_{O\_NOMINAL\_PUSCH,f,c}(j)$ and $P_{O\_UE\_PUSCH,b,f,c}(j)$. The $P_{O\_NOMINAL\_PUSCH,f,c}(j)$ is a parameter of Cell specific, $P_{O\_UE\_PUSCH,b,f,c}(j)$ is UE-specific, and multiple BWPs of the UE may be different, since the power parameter of the Cell specific needs to consider all UEs covered by IAB donor node/IAB node 1 under this CC, IAB donor node/IAB node1 does not adjust well even if requested by IAB node2, for this purpose, the exemplary IAB node2 may request a base station for the parameter $P_{O\_UE\_PUSCH,b,f,c}(j)$ of UE-Specific, the IAB node2 appears to the IAB donor node/IAB node1 as a special terminal, the IAB node2 may request one $P_{O\_UE\_PUSCH,b,f,c}(j)$ per BWP or only a parameter $P_{O\_UPUSCH,b,f,c}(j)$ of a currently active BWP.

In some embodiments, when the IAB node 2 requests or feeds back the power information of the UB-PUSCH to the IAB donor node/IAB node 1, two sets of power information may be requested or fed back, the power information acquisition parameter of the UB-PUSCH in the first set do not include power information of a DA channel or signal, and the power information acquisition parameters of the UB-PUSCH in the second set includes the power information of the DA channel or signal.

Scheme two: the IAB node 2 transmits power information of a channel or a signal in the DA to the IAB donor node/IAB node 1, exemplarily, the DA is DA that is spatial division multiplexing or frequency division multiplexing with UB. The power information of the channel or the signal in the DA includes at least one of following information: transmission power, target receiving power, reference signal receiving power (RSRP) information of a reference signal of the DA received by an IAB node 3/UE, reference signal receiving quality (RSRQ) information of the reference signal of the DA received by the IAB node 3/UE, channel state information (CSI) of the reference signal of the DA received by the IAB node3/UE a difference value between the RSRP/RSRQ of the reference signal of the DA received by the IAB node3/UE and target receiving power $P_{O\_PUSCH,b,f,c}(j)$ of the UB signal allocated by IAB node/IAB node 1 at IAB node/IAB node1. For example, the UB and the DA share a power amplifier of the IAB node 2, the UB and the DA are subjected to spatial division multiplexing through digital beams, if the performance of the reference signal of the DA to reach the IAB node3/UE in FIG. 1 is good, then the IAB donor node/IAB node 1 may adjust the transmission power of the UB according to the receiving performance of the DA at the IAB node 3/UE (for example, the acquiring parameter of the transmission power of the UB are adjusted through signaling), so that the mutual interference between the DA signal and the UB signal is reduced while the spatial division multiplexing of the DA and the UB is ensured, because the DA and the UB may be seen as two downlink users acting as MUs in the IAB node 2 in FIG. 1 and their interference problem needs to be considered, but the UB signal is controlled and scheduled by the IAB donor node/IAB node 1 in FIG. 1, and the DA is scheduled by the IAB node 2 in FIG. 1, and the IAB node2 needs to feed back the power control information of the DA to the IAB donor node/IAB node 1.

In the scheme one and scheme two described above, after the IAB node2 in FIG. 1 feeds back or requests the above information to IAB donor node/IAB node1, IAB donor node/IAB node1 may adjust the power of the UB-PUSCH with reference to the information, and allocate power control information to the UB-PUSCH, and/or the IAB donor node/IAB node1 and IAB node2 may agree with IAB node2 that the IAB node2 may obtain the transmission power of UB-PUSCH and the like according to the feedback information.

Scheme three: the IAB node2 considers the effect of the DA when calculating $P_{CMAX,f,c}$ in formula (2), for example, the above formula (3-1) is changed to (4-1) and/or the formula (3-2) is changed to (4-2):

$$P_{CMAX\_L,f,c}=\text{MIN}\{P_{EMAX,c}-\Delta TC,c,(P_{PowerClass}-\Delta P_{PowerClass})-\text{MAX}(MPR_c+A\text{-}MPR_c+\Delta T_{IB,c}+\Delta_{TC,c},P_{DA},P\text{-}MPR_c)\} \quad (4\text{-}1);$$

$$P_{CMAX\_H,f,c}=\text{MIN}\{P_{EMAX,c},P_{PowerClass}-\Delta P_{PowerClass}-P_{DA}\} \quad (4\text{-}2).$$

$P_{DA}$ is transmission power of the DA channel or signal on a time domain resource where the UB-PUSCH is located. The IAB node2 obtains $P_{CMAX,f,c}$ from the formula (2) and the formulas (3-1) and (4-2), or the IAB node2 obtains $P_{CMAX,f,c}$ from the formula (2) and the formulas (4-1) and (3-2), or the IAB node2 obtains $P_{CMAX,f,c}$ from the formula (2) and the formulas (4-1) and (4-2). When a reporting condition is satisfied, the IAB node 2 reports the selected $P_{CMAX,f,c}$ to the IAB donor/IAB node1.

Scheme four: the IAB node2 considers the influence of the DA signal when calculating the power headroom (PH) according to one of the formulas (3-3) to (3-6), such as changing the formula (3-3) to the formula (4-3):

$$PH_{type1,b,f,c}(i,j,q_d,l)=P_{CMAX,f,c}(i)-\{P_{O\_PUSCH,b,f,c}(j)+10\log_{10}(2^\mu \cdot M_{RB,b,f,c}^{PUSCH}(i))+\alpha_{b,f,c}(j)\cdot PL_{b,f,c}(q_d)+\Delta_{TF,b,f,c}(i)+f_{b,f,c}(i,l)+P_{DA}\} \quad (4\text{-}3)$$

And/or changing the formula (3-4) into the formula (4-4)

$$PH_{type1,b,f,c}(i,j,q_d,l)=\tilde{P}_{CMAX,f,c}(i)-\{P_{O\_PUSCH,b,f,c}(j)+\alpha_{b,f,c}(j)\cdot PL_{b,f,c}(q_d)+f_{b,f,c}(i,l)+P_{DA}\} \quad (4\text{-}4)$$

And/or changing the formula (3-5) into the formula (4-5)

$$PH_{type3,b,f,c}(i,q_s,l)=P_{CMAX,f,c}(i)-\{P_{O\_SRS,b,f,c}(q_s)+10\log_{10}(2^\mu \cdot M_{SRS,b,f,c}(i))+\alpha_{SRS,b,f,c}(q_s)\cdot PL_{b,f,c}(q_d)+h_{b,f,c}(i,l)+P_{DA}\} \quad (4\text{-}5)$$

And/or changing the formula (3-6) into the formula (4-6)

$$PH_{type3,b,f,c}(i,q_s,l)=\tilde{P}_{CMAX,f,c}(i)-\{P_{O\_SRS,b,f,c}(q_s)+\alpha_{SRS,b,f,c}(q_s)\cdot PL_{b,f,c}(q_d)+h_{b,f,c}(i,l)+P_{DA}\}$$

Scheme five: the IAB node2 changes the formula (1) into the formula (5-1) when calculating the power of the UB-PUSCH $$P_{PUSCH,b,f,c}(i,j,q_d,l) = \min\begin{Bmatrix} P_{CMAX,f,c}(i)-P_{DA}, \\ P_{O\_PUSCH,b,f,c}(j)+10\log_{10}(2^\mu \cdot M_{RB,b,f,c}^{PUSCH}(i))+ \\ \alpha_{b,f,c}(j)\cdot PL_{b,f,c}(q_d)+\Delta_{TF,b,f,c}(i)+f_{b,f,c}(i,l) \end{Bmatrix} \quad (5\text{-}1)$$

$P_{DA}$ is the time domain resource where the UB-PUSCH is located, a sum of transmission power of the DA channel and/or signal on the PRB with the DA channel and/or signal may be obtained, for example, by one of following formulas:

$$P_{DA} = \sum_{r \in PRB_{DA}} P_{DA,r}, \quad (5\text{-}2)$$

$$P_{DA} = f(PRB_{DA}), \quad (5\text{-}3)$$

$$P_{DA} = f_1(PRB_{DA,c}, DA_{CC}), \quad (5\text{-}4)$$

$$P_{DA} = \sum_{c \in DA_{CC}} \sum_{r=0}^{N_{PRB}^{DL,c}-1} P_{DA,r,c}, \quad (5\text{-}5)$$

$PRB_{DA}$ is the presence of a PRB set of the DA channel or signal on the time domain symbol where the UB is located, or $PRB_{DA}$ is PRB occupied by the DA channel and/or signal in bandwidth sharing power amplifier with the UB power, exemplarily, for example, $PRB_{DA}$ includes one Intra Band or one CC or one PRB with DA channel and/or signal in BWP. $P_{DA,r}$ is the transmission power of the DA channel and/or signal transmitted by the IAB node2 in FIG. 1 on the $r_{th}$ PRB, or is the transmission power of the DA channel and/or signal transmitted by the IAB node2 in FIG. 1 on the $r_{th}$ PRB in one time domain symbol. $N_{PRB}^{DL,c}$ represents a number of PRBs included in the CC c where the DA is located, $P_{DA,r,c}$ is represented as 0 when no DA signal needs to be transmitted in one PRB r in the CC c where the DA is located in the time domain symbol where the UB is located. The DA channel and/or signal described above may be transmitted to multiple UE/IAB nodes 3 under the coverage of the IAB node2, or may be transmitted to one UE/IAB node 3. $f(PRB_{DA})$ is a function of $PRB_{DA}$, $f_1(PRB_{DA,c}, DA_{CC})$ is a function of $PRB_{DA,c}$ an $DA_{CC}$, where $c \in DA_{CC}$, and $DA_{CC}$ is a set of CCs on which the DA channel and/or signal is present on the time domain symbol where the UB is located.

Scheme six: power of the UB and the DA is respectively calculated, and the power of the UB and/or the DA is reduced by using a convention method when a sum of total power of the UB and the DA is greater than a preset value, where the embodiment may be referred to as the embodiment three.

The foregoing scheme describes a power control method for the UB-PUSCH, and similarly, the foregoing scheme is also applicable to the power control of a physical uplink control channel (UB-PUCCH) and a sounding reference signal (UB-SRS).

Application Embodiment Two

In this embodiment, a determination manner of the power is determined according to at least one of following manners: received signaling information, transmitted request information, multiplexing manners among A links, whether frequency domain resources occupied by a channel or a signal in the A links are overlapped, an agreed rule, or a relationship between a sum of power of the channel or the signal in the B links and a preset value, and where A and B are positive integers larger than 1.

Exemplarily, for example, there are two formulas (6-1) and (6-2) for acquiring power of a UB link. The power of the UB link is acquired according to at least one of following information: request information transmitted by an IAB-node2 to an IAB donor node/IAB node1, signaling information transmitted by the IAB donor node/IAB node1 to the IAB node2, multiplexing manner information between a UB and a DA, whether there is an overlap between PRB resources occupied by a UB channel or signal and PRB resources occupied by a DA channel and/or signal, or an agreed rule.

$$P_{PUSCH,b,f,c}(i, j, q_d, l) = \min \begin{cases} P_{CMAX,f,c}(i) - P_{DA}, \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases} \quad (6\text{-}1)$$

$$P_{PUSCH,b,f,c}(i, j, q_d, l) = \min \begin{cases} P_{CMAX,f,c}(i) - P_{DA}, \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) - P_{DA,2^\mu \cdot M_{RB,b,f,c}^{PUSCH}(i)} \end{cases} \quad (6\text{-}2)$$

$P_{DA}$ is a sum of transmission power of a DA channel and/or signal on the PRB with the DA channel and/or signal on a time domain resource where the UB-PUSCH is located, and for example, $P_{DA}$ may be calculated through one of formulas (5-2) to (5-5).

Figure 8:
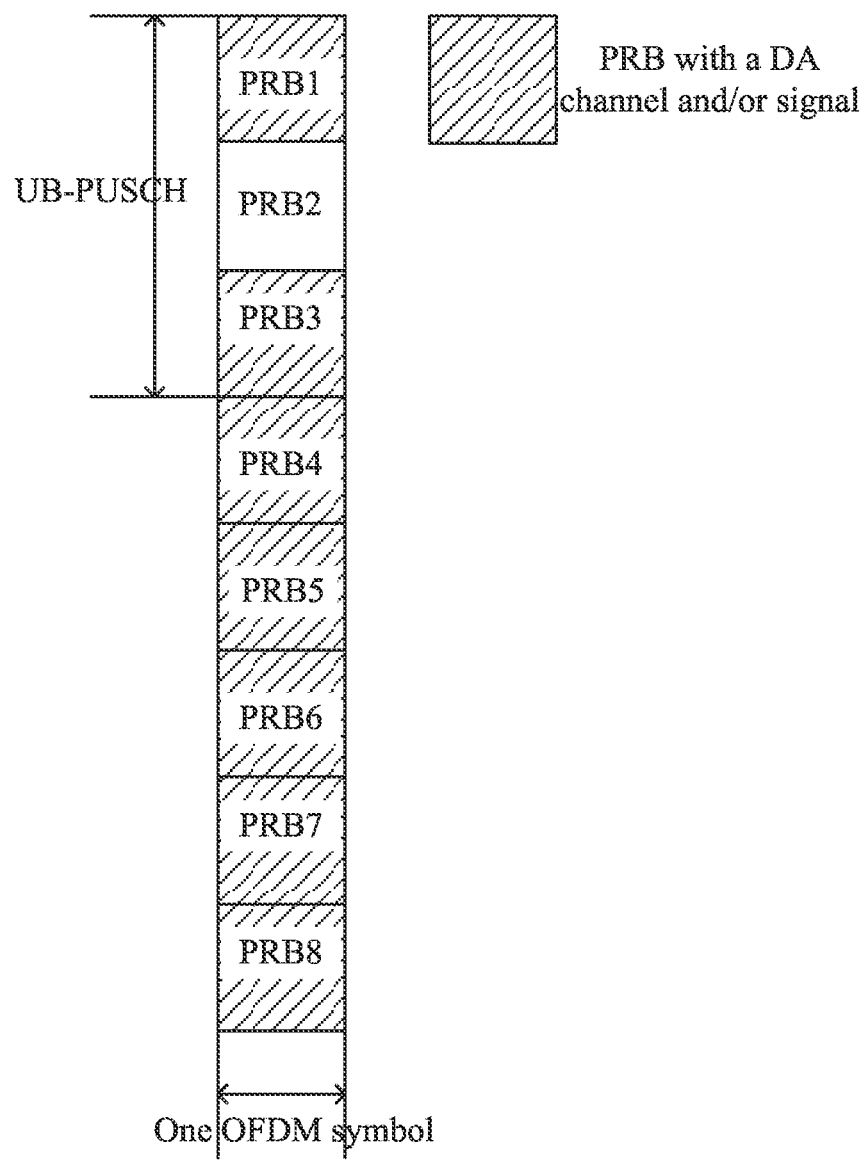
FIG. 8 is a schematic diagram of partial overlap of resources occupied by UB-PUSCH and DA in application embodiment two of the present application.

When the UB and the DA are subjected to frequency division multiplexing, only a total power of the UB is affected by a transmission power of the DA, and when the UB and the DA are subjected to spatial division multiplexing, not only the total power of the UB is affected by the transmission power of the DA, but also available power of each PRB of the UB is affected by the DA if a total power of a channel and/or a signal transmitted by the IAB node 2 in each PRB is constant. Therefore, the affection of the DA is also considered in the power calculation of each PRB of the UB in the formula (6-2), as shown in FIG. 8, FIG. 8 is a schematic diagram of a UB-PUSCH and the presence of the DA channel and/or signal, the UB-PUSCH occupies {PRB1, PRB2, PRB3}, on a time domain symbol where the UB-PUSCH is located, the PRB of the DA channel or signal is {PRB1, PRB3, PRB4~PRB8}, so that calculation may be carried out according to the power occupied by the channel and/or signal in {PRB1, PRB3, PRB4~PRB8} upon calculating $P_{DA}$, and during calculation of the transmission power of each PRB of the UB-PUSCH, the transmission power occupied by the DA channel and/or signal on the PRB may be considered. $P_{DA,2^\mu \cdot M_{RB,b,f,c}^{PUSCH}(i)}$ represents a power condition of the DA channel and/or signal in the {PRB1, PRB2, PRB3} occupied by the UB-PUSCH, such as $P_{DA,2^\mu \cdot M_{RB,b,f,c}^{PUSCH}(i)}$ may be one of: a minimum value of the DA channel and/or signal in the {PRB1, PRB2, PRB3}, a maximum value of the DA channel and/or signal in the {PRB1, PRB2, PRB3}, an average value of the DA channel and/or signal in the {PRB1, PRB2, PRB3}, or power of a DA channel or signal in preset PRBs in the {PRB1, PRB2, PRB}, such as power of the DA in a lowest PRB ID, such as power of a DA channel or signal in the PRB1, in summary, $P_{DA,2^\mu \cdot M_{RB,b,f,c}^{PUSCH}(i)}$ only has one value on the multiple PRBs occupied by the UB at this time.

In another embodiment of this embodiment, the formula (6-2) may be changed into the formula (6-3), i.e., the way to acquire the transmission power of the UB-PUSCH according to at least one of following information is acquired according to which of formulas (6-1) and (6-3): request information transmitted by the IAB node 2 to an IAB donor node/IAB node 1, signaling information transmitted by the IAB donor node to the IAB node 2, multiplexing manner information between the UB and the DA, or whether there is an overlap between PRB resources occupied by a UB channel or signal and PRB resources occupied by a DA channel and/or signal.

$$P_{PUSCH,b,f,c}(i, j, q_d, l) = \min \begin{cases} P_{CMAX,f,c}(i) - P_{DA}, \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) - \sum_{r=0}^{2^\mu \cdot M_{RB,b,f,c}^{PUSCH}(i)} P_{DA,r} \end{cases}$$

(6-3)

$P_{DA,r}$ represents transmission power of the DA channel and/or signal in the $r_{th}$ PRB where the UB-PUSCH is located, and when no DA channel or signal exists in the PRB, $P_{DA,r}$ is 0, that is, $P_{DA,r}$ has different values on the multiple PRBs occupied by the UB at this time.

The multiple physical resource block (PRBs) occupied by the UB-PUSCH may also be divided into multiple physical resource groups, $P_{DA,2^{-\mu} \cdot M_{RB,b,f,c}^{PUSCH}(i)}$ is one value in each physical resource group, and $P_{DA,2^{-\mu} \cdot M_{RB,b,f,c}^{PUSCH}(i)}$ are different values in different physical resource groups, i.e., the formula (6-3) is changed to be as shown in a formula (6-4):

$$P_{PUSCH,b,f,c}(i, j, q_d, l) = \min \begin{cases} P_{CMAX,f,c}(i) - P_{DA}, \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) - \sum_{g=0}^{X-1} P_{DA,g} \end{cases}$$

(6-4)

$P_{DA,g}$ is, in the $g_{th}$ physical resource block occupied by the UB-PUSCH, average power of the DA channel or signal, or maximum power of the DA channel or signal, or minimum power of the DA channel or signal. The division of the physical resource blocks may be informed to the IAB node 2 by the IAB donor/IAB node 1 in FIG. 1 through signaling information, and/or the division of the physical resource blocks is obtained by the IAB donor/IAB node 1 and the IAB node 2 through the agreed rule, for example, the continuously occupied frequency domain resource blocks of the UB-PUSCH belong to one physical resource block group, and non-continuous frequency domain resource blocks belong to different physical resource block groups. In some embodiments, one or more physical resource blocks are included in one physical resource block group.

The power acquisition manner of the UB-PUSCH described above may be similarly used for power acquisition of the UB-PUCCH and the UB-SRS.

In another embodiment of this embodiment, both communication parties may determine the power of the UB-PUSCH determined by one of above formulas through the agreement, for example, the power of the UB-PUSCH is determined by the IAB node/IAB node1 and the IAB node1 by adopting the formula (6-1).

In another implementation of this embodiment, a power determination method of the UB-PUSCH is determined according to a relationship between the sum of the power of the channel or the signal in the B links and the preset value, when a sum of the transmission power of the UB and the DA is less than or equal to the preset value, the transmission power of the UB-PUSCH is determined by adopting the formula (1), and when the sum of the transmission power of the UB and the DA is larger than the preset value, the transmission power of the UB-PUSCH is determined by adopting the formula (6-1), or when the sum of the transmission power of the UB and the DA is greater than the preset value, the transmission power of the UB-PUSCH is determined by adopting one of the formula (6-1) and the formula (6-4) according to the above manners.

The above method of determining the power of the UB-PUSCH may similarly be used for determining the power of the UB-PUCCH, UB-SRS.

Application Embodiment Three

In this embodiment, the IAB donor/IAB node 1 and the IAB node 2 in FIG. 1 agree that a sum of the first product and the second product does not exceed a preset threshold, where the first product is a product of transmission power of the UB and a first weight, the second product is a product of transmission power of the DA and a second weight, that is, following formula needs to be satisfied: where the weight may also be referred to as a power scaling factor.

$$w(1)\hat{P}_{UB} + w(2)\hat{P}_{DA} \leq \hat{P}_{powerclass} \qquad (6-5)$$

$0 \leq w(1) \leq 1$, $0 \leq w(2) \leq 1$, $\hat{P}_{UB}$ is a transmission power linear value of the UB, $\hat{P}_{DA}$ is a transmission power linear value of the UB, $\hat{P}_{powerclass}$ is a linear value of $P_{powerclass}$, and the $P_{powerclass}$ is a power level of the IAB node 2.

Further, $\hat{P}_{UB}$ includes multiple channels or signals in multiple CC/BWPs over the UB, and $\hat{P}_{DA}$ includes multiple channels or signals in the multiple CC/BWPs on the DA.

For example, the transmission power of the UB-PUSCH is obtained by adopting the formula (1) or the formula (6-6).

$$P_{PUSCH,b,f,c}(i, j, q_d, l) = \min \begin{cases} P_{CMAX,f,c}(i), \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) - \sum_{g=0}^{X-1} P_{DA,g} \end{cases}$$

(6-6)

When a sum of the power of the UB-PUSCH and the power of the DA is greater than a preset value, the power of the UB and the power of the DA is reduced according to an agreed proportion, and w(1), w(2) in the formula (6-5) may be a same value or different values.

In the formula (6-5), when the sum of the power of the UB and the power of the DA is greater than the preset value, power reduction ratios for all channels or signals of the UB are the same, and power reduction ratios for all channels or signals of the DA are the same, in another implementation of this embodiment, when the sum of the power of the UB and the power of the DA is greater than the preset value, power reduction ratios for different channels or signals in the UB are different. For example, a reduction factor of a control channel is large, where the reduction factor is the larger indicates that the reduction of the power is the weaker, such as when a sum of the transmission power of the UB and the transmission power of the DA is greater than the agreed value, the transmission power for the UB and the DA are reduced in the manner shown in (6-7):

$$\sum_{c \in C_{UB}} w_{UB}(i) \cdot \hat{P}_{UB,PUSCH,c}(i) + \sum_{c \in C_{DA}} w_{DA}(i) \cdot \hat{P}_{DA,PDSCH,c}(i) \leq \\ \left( \hat{P}_{PowerClass} - \hat{P}_{PUCCH}(i) - \sum_{c \in C_{DA}} \hat{P}_{DA,PDCCH,c}(i) \right) \quad (6\text{-}7)$$

$0 \leq w_{UB}(i) \leq 1$ represents a power reduction factor for the UB-PUSCH channel, and the power reduction factor is the smaller, the power reduction degree is the greater. $0 \leq w_{DA}(i) \leq 1$ represents a power reduction factor for the DA-PDSCH channel, $C_{UB}$ represents a carrier in which the UB-PUSCH is present, and $C_{DA}$ represents a carrier in which the UB-PUSCH is present. Alternatively, when the sum of the transmission power of the UB and the DA is greater than the agreed value, the transmission power for the UB and the DA are reduced in the manner shown (6-8):

$$\sum_{c \neq j, c, j \in C_{UB}} w_{UB}(i) \cdot \hat{P}_{UB,PUSCH,c}(i) + \sum_{c \in C_{DA}} w_{DA}(i) \cdot \hat{P}_{DA,PDSCH,c}(i) \leq \\ \left( \hat{P}_{PowerClass} - \hat{P}_{UB,PUSCH,j}(i) - \sum_{c \in C_{DA}} \hat{P}_{DA,PDCCH,j}(i) \right)$$

j is a component carrier where the PUSCH containing the UCI is located, power description is carried out by taking CC as one unit in the above description, and power control is not excluded by taking a band width part (BWP) as a unit in this embodiment.

In the above description, $\hat{P}$ is a linear value of P.

Application Embodiment Four

When the DB and the UA are subjected to spatial division multiplexing, in order to control interference between the DB and the UA, even when the DB and the UA are subjected to frequency division multiplexing, if the difference between power of the DB and the UA received by the IABnode 2 is large, then frequency domain leakage of the DB causes strong interference on the UA channel, so that power between the DB and the UA needs to be controlled, or a sum of receiving powers of the DB and the UA may not exceed a preset value; otherwise, the linear area of the power control is exceeded, so that the power of the DB and the UA needs to be comprehensively considered.

Scheme 1, the IAB node 2 feeds back power information of a UA channel and/or a signal to the IAB donor/IAB node 1, where the power information of the UA channel and/or the signal includes at least one of following information: target receiving power, maximum transmission power, a power headroom, a reference signal for calculating path loss, a path loss adjustment factor, a power process, or a power adjustment amount. After the IAB donor/IAB node 1 node receives the power parameter of the UA, transmission power of the DB channel or signal may be correspondingly adjusted, so that the interference between the DB and the UA is minimized. Exemplarily, the UA channel or signal corresponding to the feedback information above is spatial division multiplexing, and/or frequency division multiplexing with the DB channel or signal, i.e., the UA and the DB occupy a same moment, or occupy a same PRB in the same moment, or an intersection between time domain resources occupied by the UA and the DB is non-empty.

In the above feedback scheme, when the IAB node 2 feeds back the power information of the UA, the power information of the UA may be different due to different transmission beams of different users of the UA or different UAs of a same user, so that one way is to feed back the cell specific UA power information of all users covered under the IAB node 2, and one way is that the power information of the UA fed back is different on different time domain resources and/or different frequency domain resources.

The IAB node 2 may feed back multiple sets of UA power information, each set of power information corresponds to one reference signal of the UA, or each set of power information corresponds to a reference signal of one DB, and represents power information of the UA on a time domain resource and/or a frequency domain resource where the reference signal of the DB is located.

Scheme 2: the IAB node 2 feeds back difference information between the power information of the UA (such as the target receiving power of the UA) and the RSRP of the reference signal of the DB to the IAB donor/IAB node 1. In this way, after the IABdonor/IAB node 1 receives this difference value information, a power difference between the DB and the UA received by the IAB node 2 is known, and therefore the power of the DB may be adjusted according to the power difference. However, the UA has different target powers corresponding to different IAB node3/UE and/or different beams of a same IAB node3/UE, and there are many reference signals of the DB, therefore one scheme is to feed back a difference value between the target receiving power of a transmission beam with a preset feature in multiple transmission beams of the UA and the RSRP of a reference signal with a preset feature in multiple reference signals of the DB. The preset feature may be a maximum value, a minimum value, an intermediate value, etc. of the multiple values. Another scheme is that when the difference value is fed back, the difference value corresponds to one (reference signal index of the DB, transmission beam index of the UA) combined information. A third feedback scheme is that different time domain resources and/or frequency domain resources feed back a set of difference value information, exemplarily one time domain resource and/or frequency domain resource corresponds to a reference signal set of one DA, and/or corresponds to a transmission beam set of one UA. The transmission beam of one UA herein may be represented by one reference signal index of the UA.

Scheme 3: the IABnode 2 requests power information for the DB. The power information of the DB includes at least one of: transmission power of the IAB donor/IAB node 1 transmitting the DB (i.e., a first-type channel or signal); the receiving power of the DB received by the IAB node 2 (i.e., the first communication node); or a difference value between receiving power of the DB received by the IABnode 2 and target receiving power of the DB received by the IABnode 2;

Scheme 4, the IABnode 2 feeds back one or more of transmission power acquisition parameters of the UA to the IAB donor/IABnode 1, and an acquisition parameter of the transmission power of the UA may include one or more of: a number of PRBs occupied by the UA, a sub-carrier spacing of the UA, a relationship between the sub-carrier spacing of the UA and a sub-carrier spacing of the DB, a number of time domain symbols occupied by the UA; a number of PRBs included in intersection between PRB set occupied by the UA and PRB set occupied by the DB; or a number of time domain symbols included in intersection between a time domain symbol set occupied by the UA and a time domain symbol set occupied by the DB.

Application Embodiment Five

In the embodiments described above, power of the UB and the DA needs to be considered comprehensively and/or power of the DB and the UA needs to be considered comprehensively, in particular the UB and the DA share a set of transmission antennas at the IAB node 2, the UB and the DA are subjected to spatial division multiplexing by digital beams, similarly, the DB and the UA are subjected to spatial division multiplexing reception by digital beams. However, the UB and the DA are subjected to the spatial division multiplexing through different panels, when an independent power amplifier is arranged between the two panels, the power of the UB and the power of the DA do not need to be comprehensively considered from the perspective of power limitation, and similarly, the power of the DB and the power of the UA does not need to be comprehensively considered from the perspective of power limitation in the scene.

Therefore, whether the two links are independent power amplifiers or not is firstly determined, whether the power of the two links needs to be comprehensively considered or not is determined according to whether the two links are the independent power amplifiers or not, and whether an independent panel is associated with at least one of following information: whether the UB and the DA share power information or not at a first communication node; whether a sum of the transmission power of the UB and the DA needs to be less than a first preset value or not, and if yes, it represents that the shared power amplifier or the power sum needs to be limited; whether a sum of the receiving power of the UB and the DA needs to be less than a second preset value; whether the component carrier where the first-type channel or signal is located and the CC where the second-type channel or signal is located belong to one frequency band or not, and if yes, the component carrier where the first-type channel or signal is located and the CC where the second-type channel or signal is located generally share a power amplifier and are independent power amplifiers under the condition of not belonging to different Bands; a relationship between the carrier frequency where the UB is located and a preset value, for example, the low frequency is generally the shared power amplifier; a relationship between a carrier frequency where the DA is located and the preset value; whether a quasi co-located reference signal associated with the spatial receiving filter parameter exists in all quasi co-located reference signals associated with the UB, for example, if it is associated with the spatial receiving filter parameter, then it represents that a high frequency or a receiving beam typically do not share a power amplifier; whether a quasi co-located reference signal associated with the spatial receiving filter parameter exists in all quasi co-located reference signals associated with the DA; whether the UB configures spatial transmission filter parameter information, for example, configuration of the spatial transmission filter parameter is generally independent power amplifiers; or whether the DA configures the spatial transmission filter parameter information.

The IAB node 2 in FIG. 1 may also feed back at least one of the above information reflecting whether the UB and the DA need to comprehensively consider power to IAB donor/IAB node 1.

Application Embodiment Six

In this embodiment, the power of one uplink channel or signal in multiple time domain symbols occupied by one time unit is different. Exemplarily, the power of one uplink channel and/or signal in multiple time domain symbols occupied in one slot may be different. In this embodiment, one time unit is one slot, and one time unit may also be multiple slots occupied by one uplink channel or signal corresponding to one-time scheduling.

In the above embodiments, it is basically considered that the time domain resources occupied by the UB channel or signal and the DA channel and/or signal overlap, or that the transmission power in the multiple time domain symbols occupied by the UB channel or signal are the same. In this embodiment, since there may be only partial time domain overlap between the UB channel or signal and the DA channel or signal, it needs to be considered that different groups of time domain symbols of the multiple time domain symbols occupied by the UB channel or signal may have different transmission power in order to fully utilize the transmission power of the IAB node.

For example, multiple time domain symbols occupied by one UB channel or signal include C time domain symbol sets, each time domain symbol set of the C time domain symbol sets is associated with a set of power information, and C is a positive integer greater than 1.

Figure 9:
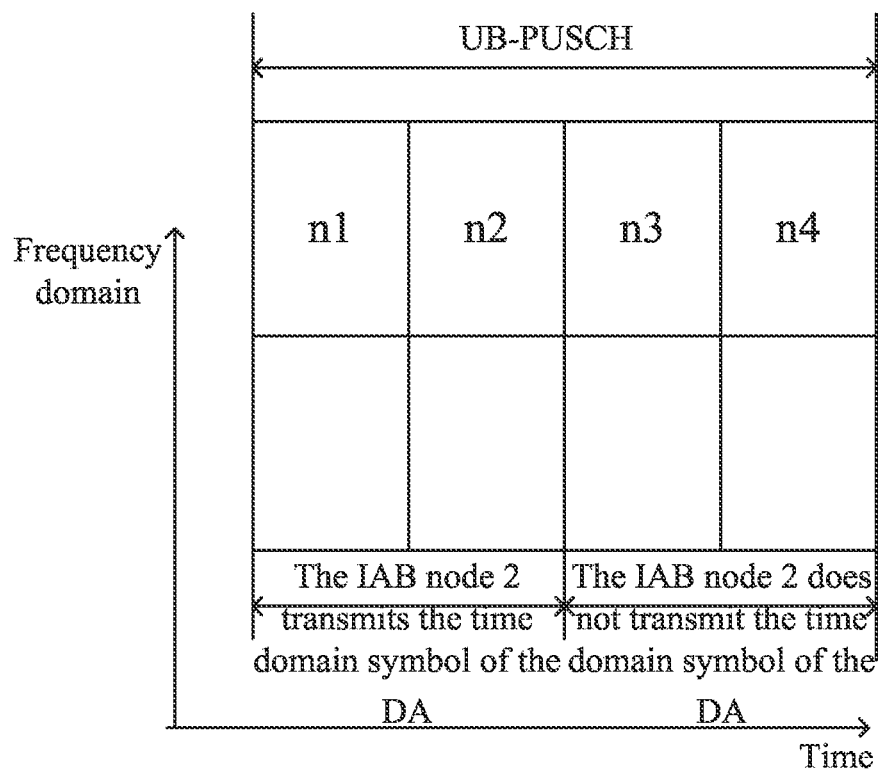
FIG. 9 is a schematic diagram of resources occupied by DA on multiple time domain symbols occupied by UB-PUSCH in application embodiment six of the present application.

As shown in FIG. 9, 4 time domain symbols occupied by the UB-PUSCH are divided into 2 time domain symbol sets, as shown in FIG. 9, the 4 time domain symbols, i.e., {n1, n2, n3, n4}, occupied by the UB-PUSCH are divided into 2 time domain symbol sets, i.e., {n1, n2} and {n3, n4}, the IAB node2 needs to transmit UB and DA signals on the {n1, n2} time domain symbol, and the IAB node2 needs to transmit the UB only on the {n3, n4} time domain symbol, and does not need to transmit the DA channel and/or signal.

There may be following schemes for this purpose:

Scheme 1: an influence of the DA is considered upon calculating $P_{CMAX\_L,f,c}$, and the formula (4-1) is updated to a formula (7-1).

$$P_{CMAX\_L,f,c,tj} = \text{MIN}\{P_{EMAX,c} - \Delta TC, c, (P_{PowerClass} - \Delta P_{PowerClass}) - \text{MAX}(MPR_c + A\text{-}MPR_c + \Delta T_{IB,c} + \Delta_{TC,c} + P_{DA,tj}, P\text{-}MPR_c)\} \quad (7\text{-}1)$$

$tj=0, 1, \ldots C-1$, $P_{CMAX\_L,f,c,tj}$ is maximum power corresponding to the UB-PUSCH in the $tj_{th}$ time domain symbol set, and/or a formula (4-2) is updated to a formula (7-2):

$$P_{CMAX\_H,f,c,tj} = \text{MIN}\{P_{EMAX,c}, P_{PowerClass} - \Delta P_{PowerClass} - P_{DA,tj}\} \quad (7\text{-}2)$$

Scheme 2: an influence of the DA is considered upon calculating a power headroom (PHR), and the formula (4-3) is updated to a formula (7-3).

$$PH_{type1b,f,c}(i,j,q_d,l,tj) = P_{CMAX,f,c}(i) - \{P_{O\_PUSCH,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l) + P_{DA,tj}\} \quad (7\text{-}3)$$

and/or the formula (4-4) is changed to a formula (7-4)

$$PH_{type1,b,f,c}(i,j,q_d,l,tj) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l) + P_{DA,tj}\} \quad (7\text{-}4)$$

and/or the formula (4-5) is changed to a formula (7-5)

$$PH_{type3,b,f,c}(i,q_s,l,tj) = P_{CMAX,f,c}(i) - \{P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i,l) + P_{DA,tj}\} \quad (7\text{-}5)$$

and/or the formula (4-6) is changed to a formula (7-6)

$$PH_{type3,b,f,c}(i,q_s,l,tj) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{f,c}(i,l) + P_{DA,tj}\} \quad (7\text{-}6)$$

tj=0, 1, ... C−1, $PH_{type1,b,f,c}(i,j,q_d,l,tj)$ is a power headroom of type 1 on the $tj_{th}$ time domain symbol set. $PH_{type3,b,f,c}(i, q_s,l,tj)$ is a power headroom of type 3 on the $tj_{th}$ time domain symbol set.

Scheme 3: an influence of the DA is considered upon calculating the transmission power of the UB-PUSCH, so that the formula (5-3) or the formula (6-1) may be updated to a formula (7-7):

$$P_{PUSCH,b,f,c}(i, j, q_d, l, tj) = \min \begin{Bmatrix} P_{CMAX,f,c}(i) - P_{DA,tj}, \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} \quad (7\text{-}7)$$

and/or the formula (6-2) is updated to a formula (7-8)

$$P_{PUSCH,b,f,c}(i, j, q_d, l, tj) = \min \begin{Bmatrix} P_{CMAX,f,c}(i) - P_{DA,tj}, \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) - \\ P_{DA,2^\mu \cdot M_{RB,b,f,c}^{PUSCH}(i),tj} \end{Bmatrix} \quad (7\text{-}8)$$

and/or the formula (6-3) is updated to a formula (7-9)

$$P_{PUSCH,b,f,c}(i, j, q_d, l, tj) = \min \begin{Bmatrix} P_{CMAX,f,c}(i) - P_{DA,tj}, \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) - \\ \sum_{r=0}^{2^\mu \cdot M_{RB,b,f,c}^{PUSCH}(i)} P_{DA,r,tj} \end{Bmatrix} \quad (7\text{-}9)$$

and/or the formula (6-4) is updated to a formula (7-10)

$$P_{PUSCH,b,f,c}(i, j, q_d, l, tj) = \min \begin{Bmatrix} P_{CMAX,f,c}(i) - P_{DA,tj}, \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) - \sum_{g=0}^{X_{tj}-1} P_{DA,g_{tj},tj} \end{Bmatrix}$$

tj=0, 1 ... C−1, $X_{tj}$ is a number of the physical resource block groups of the UB-PUSCH on the $tj_{th}$ time domain symbol set, and $g_{tj}$ is a $g_{tj}$ physical resource block group of the UB-PUSCH on the $tj_{th}$ time domain symbol set. $P_{PUSCH,b,f,c}(i,j,q_d,l,tj)$ is transmission power of the UB-PUSCH on the $tj_{th}$ time domain symbol set, and exemplarily, transmission power of the UB-PUSCH on multiple time domain symbols included in one time domain symbol set is the same, for example, the transmission power of the UB-PUSCH on each time domain symbol in the $tj_{th}$ time domain symbol set is $P_{PUSCH,b,f,c}(i,j,q_d,l,tj)$ In the formula (7-10), the division of the frequency domain resource block group of the UB is different on the different time domain symbol sets, and in this embodiment, the same division of the frequency domain resource block group of the UB on the different time domain symbol sets tj is not excluded, i.e., the formula (7-10) is updated to a formula (7-11). One time domain symbol set described above includes one or more time domain symbols.

$$P_{PUSCH,b,f,c}(i, j, q_d, l, tj) = \min \begin{Bmatrix} P_{CMAX,f,c}(i) - P_{DA,tj}, \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) - \sum_{g=0}^{X-1} P_{DA,g,tj} \end{Bmatrix} \quad (7\text{-}11)$$

$P_{DA,tj}$ represents the transmission power of the DA corresponding to the $tj_{th}$ time domain symbol set of the UB-PUSCH, the transmission power of the DA corresponding to different time domain symbol sets are different, as shown in FIG. 9, $P_{DA,0}$ is transmission power of the DA in the time domain symbol set {n1, n2}, $P_{DA,1}$ is transmission power of the DA in the time domain symbol set {n3, n4}, and $P_{DA,1}$ is 0 since no the DA channel and/or signal exists in the time domain symbol set {n3, n4}. Exemplarily, transmission power on the multiple time domain symbols of a corresponding DA in the $tj_{th}$ time domain symbol set of the UB-PUSCH is the same, as shown in FIG. 9, transmission power of the DA on the {n1, n2} two time domain symbols is the same, and when transmission power on the DA on the {n1, n2} is different, $P_{DA,0}$ may adopt a maximum value, or a minimum value, or an average value in the {n1, n2} time domain symbols, or a value obtained according to the transmission power of the DA in the {n1, n2} and according to the agreed rule.

Figure 10:
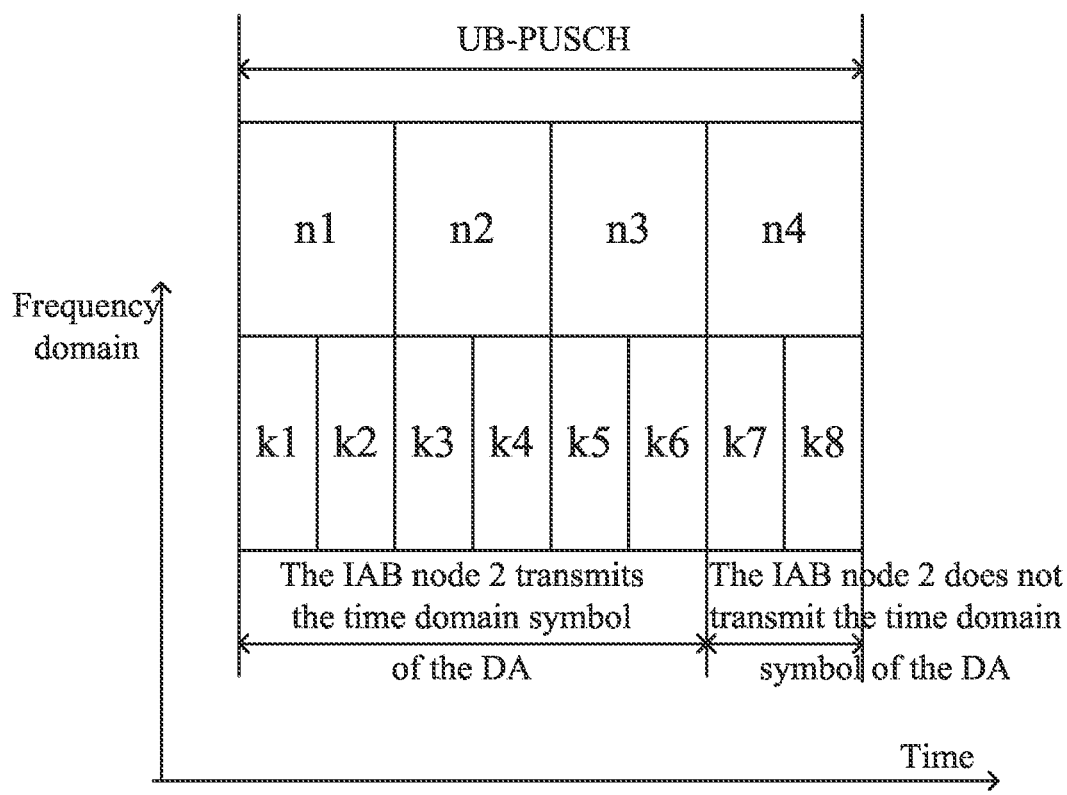
FIG. 10 is a schematic diagram of different sub-carrier spacings of UB and DA in application embodiment six of the present application.

When the sub-carrier intervals of the UB and the DA are different and thus time domain symbol lengths are different, $P_{DA,tj}$ represents transmission power after transmission power of the DA is converted into one time domain symbol of the UB. As shown in FIG. 10, if the time domain symbol of one UB includes the time domain symbols of multiple DAs, then $P_{DA,tj}=2^{-\mu}P_{DA,tj,15\ KHz}$, $2^\mu*15$ KHz is the sub-carrier spacing of the UB-PUSCH. $P_{DA,tj,15\ KHz}$ is transmission power on one time domain symbol of DA obtained at 15 KHz sub-carrier spacing.

$P_{DA,r,tj}$ represents transmission power of the DA in the $r_{th}$ PRB in $2^\mu \cdot M_{RB,b,f,c}^{PUSCH}(i)$ PRBs occupied by the UB-PUSCH in the $tj_{th}$ time domain symbol set where the UB-PUSCH is located, $P_{DA,2^\mu \cdot M_{RB,b,f,c}^{PUSCH}(i),tj}$ represents multiple transmission powers of the DA in the $2^\mu \cdot M_{RB,b,f,c}^{PUSCH}(i)$ PRBs occupied by the UB-PUSCH in the $tj_{th}$ time domain symbol set where the UB-PUSCH is located, the DA in each PRB of the $2^\mu \cdot M_{RB,b,f,c}^{PUSCH}(i)$ PRBs occupied by the UB-PUSCH has one transmission power, $P_{DA,2^\mu \cdot M_{RB,b,f,c}^{PUSCH}(i),tj}$ may be a minimum value or a maximum value or an average value or an intermediate value of the transmission power of the DA in the multiple PRBs, or power of the DA in the preset PRB, or a value obtained according to transmission power of the DA in the multiple PRBs and an agreed function. $P_{DA,g_{tj},tj}$ is the transmission power of the DA in the $g_{tj}$ physical resource block group in the $tj_{th}$ time domain symbol set, where there is transmission power of one DA in each PRB in each time domain symbol in the $tj_{th}$ time domain symbol set, in this way, there may be transmission power of multiple DAs in the physical resource block in the time domain symbol set, $P_{DA,g_{ij},tj}$ is the transmission power of the DA satisfying the preset feature in the multiple transmission power, such as a maximum value, a minimum value, an intermediate value, an average value, the transmission power of the DA in preset time domain symbol of the preset PRB, or $P_{DA,g_{ij},tj}$ is obtained according to the multiple transmission power and a preset function.

In multiple embodiments of the present application, one time unit may be one of: one slot, T time domain symbol lengths, and T time domain symbol lengths obtained by one reference sub-carrier, and T is a positive integer. One time domain symbol may be one OFDM symbol.

Application Embodiment Seven

In the embodiment, one piece of reference signal resource indication information is associated with multiple sets of power information, for example, one piece of sounding resource indication (SRI) is associated with multiple sets of power information, and one set of power information is selected from the multiple sets of power information through signaling information or an agreed rule.

For example, RRC signaling configures multiple sets of power information for one SRI, where each set of power information includes at least one of following information: target power $P_{O\_PUSCH,b,f,c}(j)$, a path loss adjustment factor $\alpha_{b,f,c}(j)$, a downlink reference signal $q_d$ for calculating a path loss reference, or a power adjustment parameter $\delta_{PUSCH,b,f,c}$. Then, the MAC-CE signaling activates one of the sets for SRI or the DCI activates one of the sets for SRI.

Or, the power information of the SRI on different time unit sets is one set of the multiple sets of power information according to the agreed rule. For example, the power of the SRI on {slot2k+1, k=0, 1, 2 . . . } is a first set of power information, and the power of the SRI on {slot2k, k= 0, 1, 2 . . . } is a second set of power information.

In some embodiments, according to the TA information corresponding to the SRI, the power information associated with the SRI is determined, for example, one SRI is associated with 2 sets of power information and is also associated with 2 TA values, and when it is determined that the power information of the SRI is obtained according to one of the 2 sets of power information, which one of two TAs being the SRS corresponding to the transmission of the SRI may also be obtained. The TA is an advance amount of transmitting an uplink signal relative to a downlink timing.

In some embodiments, it is determined that, according to a control resource set (CORESET, i.e., control channel resource) where the downlink control information (DCI) for scheduling the SRI is located, the power information of the SRI is acquired according to which of the 2 sets of power information, for example, when the DCI is in CORESET1, the power information of the SRI is obtained according to a first set of power information, for example when the DCI is in CORESET2, the power information of the SRI is acquired according to the second set of power information.

Similarly, it is determined that, according to the CORESET where the DCI for scheduling the SRI is located, the TA information of the SRI is acquired according to which of the 2 sets of TA information, for example, when the DCI is in the CORESET1, the TA information of the SRI is acquired according to the first set of TA information, for example, when the DCI is in the CORESET2, the TA information of the SRI is acquired according to the second set of TA information.

The power/TA information associated with one SRI is determined according to the CORESET, or the association is established between the CORESET group where the CORESET is located and the power/TA information, for example, a CORESET group 1 is associated with a first set of power/TA, a CORESET group 2 is associated with a second set of power/TA, and selection information of the power/TA is determined according to the CORESET group where the DCI for scheduling the SRI is located.

The method for associating the reference signal resource indication information with the multiple sets of power information may be similarly used for associating the indication information of one reference signal resource combination with the multiple sets of power information, and the reference signal may also be a demodulation reference signal or an uplink random access sequence signal.

Embodiment Five

Figure 11:
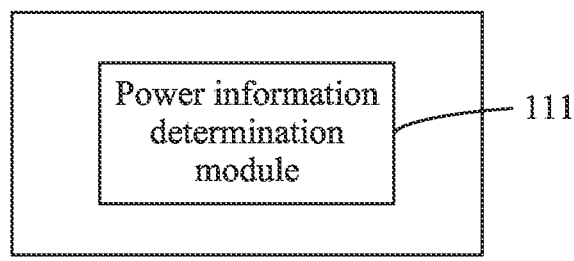
FIG. 11 is a schematic diagram of a power determination apparatus in embodiment five of the present application.

This embodiment provides a power determination apparatus. Please refer to FIG. 11, this power determination apparatus includes a power information determination module 111. The power information determination module 111 is configured to determine power information according to signaling information and/or an agreed rule, where the power information includes at least one of: first-type power information associated with a first-type channel or signal, second-type power information associated with a second-type channel or signal, or third-type power information associated with the first-type channel or signal; where an acquisition parameter of the first-type power information includes the second-type power information, and an acquisition parameter of the third-type power information do not include the second-type power information; and where the first-type channel or signal is a channel or a signal between the first communication node and a second communication node, and the second-type channel or signal is a channel or a signal between the first communication node and one or more third communication nodes.

In some embodiments, the first-type channel or signal is a channel or a signal transmitted by the first communication node to the second communication node; and/or the second-type channel or signal is a channel or a signal transmitted by the first communication node to the third communication node.

In some embodiments, the power information may further include at least one of: transmission power of the second-type channel or signal, receiving power of the second-type channel or signal, a difference value between the receiving power of the second-type channel or signal and receiving power of the first-type channel or signal, or a difference value between the transmission power of the second-type channel or signal and transmission power of the first-type channel or signal, and where the receiving power includes actual receiving power and/or target receiving power.

In some embodiments, the acquisition parameter of the first-type power information may further include at least one of: frequency domain resource information corresponding to the second-type channel or signal, time domain resource information corresponding to the second-type channel or signal, space domain resource information corresponding to the second-type channel or signal, quasi co-located reference signal information of the second-type channel or signal, sub-carrier spacing of the second-type channel or signal, or relationship information between a sub-carrier spacing of the first-type channel or signal and the sub-carrier spacing of the second-type channel or signal.

In some embodiments, the first-type channel or signal is a channel or a signal transmitted by the second communication node to the first communication node; and/or the second-type channel or signal is a channel or a signal transmitted by the third communication node to the first communication node.

In some embodiments, the determined power information may further include at least one of: transmission power of the first-type channel or signal transmitted by the second communication node; receiving power of the first-type channel or signal received by the first communication node; a difference value between the receiving power of the first-type channel or signal received by the first communication node and receiving power of the second-type channel or signal received by the first communication node; a difference value between the receiving power of the first-type channel or signal received by the first communication node and target receiving power of the first-type channel or signal received by the first communication node; or one or more parameters of transmission power acquisition parameters of the second-type channel or signal.

In some embodiments, the step in which the first communication node determines the power information according to the agreed rule includes: in a case where the second-type channel or signal exists on a time resource where the first-type channel or signal is located, the determined power information includes the first-type power information; and/or in a case where the second-type channel or signal does not exist on the time resource where the first-type channel or signal is located, the determined power information includes the third-type power information.

In some embodiments, the step in which the first communication node determines the power information according to the agreed rule may further include: in a case where an intersection between a time domain resource occupied by the first-type channel or signal and a time domain resource occupied by the second-type channel or signal is non-empty, the determined power information includes the first-type power information; and/or in a case where the intersection between the time domain resource occupied by the first-type channel or signal and the time domain resource occupied by the second-type channel or signal is empty, the determined power information includes the third-type power information.

In some embodiments, power information on the multiple time domain symbols occupied by the first-type channel or signal is the same; and/or on multiple time domain symbols occupied by the first-type channel or signal and including the second-type channel or signal, the determined power information includes the first-type power information, where the second-type power information included in the acquisition parameter of the first-type power information is same on multiple time domain symbols occupied by the first-type channel or signal and including second-type channel or signal.

In some embodiments, when the first-type channel or signal occupies at least two time domain symbols, if the at least two time domain symbols exist on a time domain symbol of the second-type channel or signal, then the determined power information includes the first-type power information; if the at least two time domain symbols do not exist on the time domain symbol of the second-type channel or signal, then the determined power information includes the third-type power information; in different time domain symbols of the at least two time domain symbols, the power information of the first-type channel or signal is different; if the at least two time domain symbols exist in each time domain symbol of the second-type channel or signal, then the first-type power information of the first-type channel or signal is obtained according to the second-type power information of the second-type channel or signal in this time domain symbol; the power information of the first-type channel or signal is different in the multiple time domain symbols.

In some embodiments, when the first communication node determines, according to the agreed rule, that the power information includes the second-type power information: if the first-type channel or signal exists on a time resource where the second-type channel or signal is located, then the acquisition parameter of the second-type power information includes power information associated with the first channel or signal; and/or if the first-type channel or signal does not exist on the time resource where the second-type channel or signal is located, then the acquisition parameter of the second-type power information does not include the power information associated with the first channel or signal.

In some embodiments, a power information type included in the power information is associated with at least one of following information: multiplexing manner information of the first-type channel or signal and the second-type channel or signal; whether the first-type channel or signal and the second-type channel or signal fall in a same time unit; information on whether the first-type channel or signal shares power with the second-type channel or signal at the first communication node; a relationship between a carrier frequency where the first-type channel or signal is located and a preset value; a relationship between a carrier frequency where the second-type channel or signal is located and the preset value; whether a quasi co-located reference signal associated with a spatial receiving filter parameter exists in all quasi co-located reference signals associated with the first-type channel or signal; whether a quasi co-located reference signal associated with the spatial receiving filter parameter exists in all quasi co-located reference signals associated with the second-type channel or signal; whether the first-type channel or signal is configured with spatial transmission filter parameter information; or whether the second-type channel or signal is configured with the spatial transmission filter parameter information. In various embodiments of the present application, two pieces of information have an associated representation that one piece of information may be derived from the other piece of information, and/or that some specific combined values of one piece of information and the other piece of information may not occur at the same time.

In some embodiments, when the multiplexing manner is time division multiplexing, the determined power information includes the third-type power information; and/or when the multiplexing manner is frequency division multiplexing and/or spatial division multiplexing, the determined power information includes at least one of following power information: the first-type power information, the second-type power information or the third-type power information.

In some embodiments, the method may further include at least one of: the first communication node reports or requests the determined power information to the second communication node; the first communication node transmits the first-type channel or signal according to the determined power information; the first communication node receives the first-type channel or signal according to the determined power information; the first communication node transmits the second-type channel or signal according to the determined power information; or the first communication node receives the second-type channel or signal according to the determined power information.

In some embodiments, scheduling information of the first-type channel or signal is transmitted to the first communication node by the second communication node; and/or scheduling information of the second-type channel or signal is transmitted to the third communication node by the first communication node.

In some embodiments, the determined power information includes P sets of values of same-type power information, and the P sets of values respectively correspond to P channels, or P signals; and/or the first communication node transmits report information or request information to the second communication node, where the report information or the request information includes the determined power information and a channel index and a signal index corresponding to the determined power information.

In some embodiments, the method satisfies at least one of: the first-type channel or signal and the second-type channel or signal fall in a same time unit; where the same time unit may refer to one orthogonal frequency division multiplexing (OFDM) symbol, or one time domain symbol, or it may be a slot, or a sub-frame, etc; the time domain resource occupied by the first-type channel or signal is overlapped with the time domain resource occupied by the second-type channel or signal; the first-type channel or signal and the second-type channel or signal are subjected to frequency division multiplexing; the first-type channel or signal and the second-type channel or signal are channel or signal transmitted by the first communication node; the first-type channel or signal and the second-type channel or signal are channel or signal received by the first communication node; the first-type channel or signal and the second-type channel or signal fall in one frequency band; the first-type channel or signal and the second-type channel or signal share power of the first communication node; the carrier frequency where the first-type channel or signal is located is less than the preset value; the carrier frequency where the second-type channel or signal is located is less than the preset value; no quasi co-located reference signal associated with the spatial receiving filter parameter exist in the all quasi co-located reference signals associated with the first-type channel or signal; no quasi co-located reference signal associated with the spatial receiving filter parameter exists in the all quasi co-located reference signals associated with the second-type channel or signal; the first-type channel or signal is not configured with the spatial transmission filter parameter information; or the second-type channel or signal is not configured with the spatial transmission filter parameter information.

According to the power determination apparatus provided in the embodiments of the present application, the first communication node determines the power information according to the signaling information and/or the agreed rule, and the power information includes at least one of: the first-type power information associated with the first-type channel or signal, the second-type power information associated with the second-type channel or signal, or the third-type power information associated with the first-type channel or signal; where the acquisition parameter of the first-type power information includes the second-type power information, and the acquisition parameter of the third-type power information do not include the second-type power information; and where the first-type channel or signal is the channel or the signal between the first communication node and the second communication node, and the second-type channel or signal is the channel or the signal between the first communication node and the one or more third communication nodes, so that the determination of associated power information with channels and signals between multiple communication nodes in some particular implementations may achieve technical effects including, but not limited to, better power control, and improved power utilization efficiency.

Embodiment Six

Figure 12:
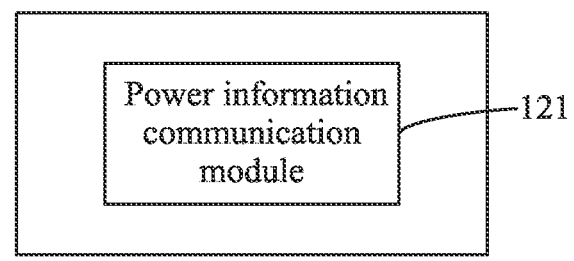
FIG. 12 is a schematic diagram of a power determination apparatus in embodiment six of the present application.

This embodiment provides a power determination apparatus. Please refer to FIG. 12, this power determination apparatus includes a power information communication module 121. The power information communication module 121 is configured to receive request information transmitted by a first communication node, and/or transmit signaling information to the first communication node, where at least one of the request information and/or the signaling information includes at least one of: first-type power information associated with a first-type channel or signal, second-type power information associated with a second-type channel or signal, or third-type power information associated with the first-type channel or signal; where an acquisition parameter of the first-type power information includes the second-type power information, and an acquisition parameter of the third-type power information do not include the second-type power information; and where the first-type channel or signal is a channel or a signal between the first communication node and the second communication node, and the second-type channel or signal is a channel or a signal between the first communication node and one or more third communication nodes.

In this embodiment, the signaling information is used for the first communication node to determine the power information according to the signaling information, representing that the signaling information includes the determined power information, and/or representing that the signaling information includes an acquisition parameter of the determined power information.

In some embodiments, the first-type channel or signal is a channel or a signal transmitted by the first communication node to the second communication node; and/or the second-type channel or signal is a channel or a signal transmitted by the first communication node to the third communication node.

In some embodiments, the signaling information and/or the request information may include at least one of: transmission power of the second-type channel or signal, receiving power of the second-type channel or signal, a difference value between the receiving power of the second-type channel or signal and receiving power of the first-type channel or signal, a difference value between the transmission power of the second-type channel or signal and transmission power of the first-type channel or signal, or selection information acquired by power information of the first-type channel or signal according to the first-type power information or the third-type power information; and where the receiving power includes actual receiving power and/or target receiving power.

In some embodiments, the signaling information and/or the request information may further include at least one of following acquisition parameters of the first-type power information: frequency domain resource information corresponding to the second-type channel or signal, time domain resource information corresponding to the second-type channel or signal, space domain resource information corresponding to the second-type channel or signal, quasi co-located reference signal information of the second-type channel or signal, sub-carrier spacing information of the second-type channel or signal, or relationship information between a sub-carrier spacing of the first-type channel or signal and a sub-carrier spacing of the second-type channel or signal.

In some embodiments, the request information and/or the signaling information may include at least one of: a power priority between the power information of the first-type channel or signal and power information of the second-type channel or signal, a power scaling factor in the first-type channel or signal, a power scaling factor in the second-type channel or signal, multiple power scaling factors corresponding to multiple channel or signal included in the first-type channel or signal, or multiple power scaling factors corresponding to multiple channel or signal included in the second-type channel or signal; when a sum of power of the first-type channel or signal and power of the second-type channel or signal exceeds a preset value, the power scaling factor satisfies at least one of: the power scaling factor of the first-type channel or signal is determined according to the power priority; the power scaling factor of the second-type channel or signal is determined according to the power priority; the first-type channel or signal is subjected to power scaling according to the power scaling factor in the first-type channel or signal; the second-type channel or signal is subjected to the power scaling according to the power scaling factor in the second-type channel or signal; the first-type channel or signal is subjected to the power scaling according to the power scaling factor in the first-type channel or signal; the multiple channel or signal included in the first-type channel or signal are subjected to the power scaling according to a power scaling factor corresponding to each channel or signal; or the multiple channel or signal included in the second-type channel or signal are subjected to the power scaling according to the power scaling factor corresponding to each channel or signal.

In some embodiments, the first-type channel or signal is a channel or a signal received by the first communication node from the second communication node; and/or the second-type channel or signal is a channel or a signal received by the first communication node from the third communication node.

In some embodiments, the signaling information and/or the request information may include at least one of: transmission power of the first-type channel or signal transmitted by the second communication node; receiving power of the first-type channel or signal received by the first communication node; a difference value between the receiving power of the first-type channel or signal received by the first communication node and receiving power of the second-type channel or signal received by the first communication node; one or more parameters of transmission power acquisition parameters of the second-type channel or signal; or whether the power information of the first-type channel or signal is acquired according to the first-type power information or the third-type power information; where the receiving power includes actual receiving power and/or target receiving power.

In some embodiments, the signaling information and/or the request information includes: a corresponding relationship between C1 time domain symbol sets and C1 sets of power information of the first-type channel or signal; and/or a division condition of the C1 time domain symbol sets; where multiple time domain symbols occupied by the first-type channel or signal includes the C1 time domain symbol sets, and the C1 time domain symbol sets satisfy at least one of following features: the C1 time domain symbol sets include a first time domain symbol set and a second time domain symbol set, and an intersection between the first time domain symbol set and the second time domain symbol set is an empty set; an intersection between any two time domain symbol sets in the C1 time domain symbol sets is an empty set; power information of the first-type channel or signal on multiple time domain symbols included in one time domain symbol set is the same; the second-type power information included in the acquisition parameter of the first-type power information of the first-type channel or signal on multiple time domain symbols included in one time domain symbol set is the same; the second-type power information included in the acquisition parameter of the first-type power information of the first-type channel or signal on multiple time domain symbols included in one time domain symbol set is obtained according to multiple power values of the second-type channel or signal in the multiple of time domain symbols in the time domain symbol set and the agreed rule; each time domain symbol set of the C1 time domain symbol sets is associated with a set of power information of the first-type channel or signal; each time domain symbol set of the C1 time domain symbol sets is associated with a set of values of the second-type power information in first-type channel or signal acquisition parameters; the C1 time domain symbol sets are associated with C1 sets of power information of the first-type channel or signal; each time domain symbol set of the C1 time domain symbol sets is associated with C1 sets of values of the second-type power information in the first-type channel or signal acquisition parameters; a division of the time domain symbol sets is determined according to the second-type power information; a division of the time domain symbol sets is determined according to power information of the second-type channel or signal on the multiple of time domain symbols occupied by the first-type channel or signal; the C1 time domain symbol sets belong to one time unit; the C1 time domain symbol sets belong to Y time units, where the Y time units are Y time units occupied by the first-type channel or signal scheduled by one piece of signaling information; or a division of the time domain symbol sets is determined according to the signaling information; where C1 is a positive integer greater than or equal to 1.

In some embodiments, the method may further include at least one of: the second communication node transmits the first-type channel or signal according to the determined power information; the second communication node receives the first-type channel or signal according to the determined power information; the second communication node transmits the second-type channel or signal according to the determined power information; or the second communication node receives the second-type channel or signal according to the determined power information; where the determined power information is obtained by the second communication node according to the request information and/or the signaling information.

In some embodiments, the signaling information includes P sets of values of same-type power information, and the P sets of values respectively correspond to P channels, or P signals, or P frequency domain bandwidths, or P time domain resource sets, or Preference signal combinations; and/or the second communication node receives report information or request information transmitted by the first communication node, where the report information or the request information includes the power information and at least one of following indexes corresponding to the power information: a channel index, a signal index, a frequency domain bandwidth index, a time domain resource set index or a reference signal combination index.

In some embodiments, the method satisfies at least one of: the first-type channel or signal and the second-type channel or signal fall in a same time unit; the time domain resource occupied by the first-type channel or signal is overlapped with the time domain resource occupied by the second-type channel or signal; the first-type channel or signal and the second-type channel or signal are subjected to frequency division multiplexing; the first-type channel or signal and the second-type channel or signal are channel or signal transmitted by the first communication node; the first-type channel or signal and the second-type channel or signal are channel or signal received by the first communication node; the first-type channel or signal and the second-type channel or signal fall in one frequency band; the first-type channel or signal and the second-type channel or signal share power of the first communication node; the sum of the transmission power of the first-type channel or signal and the transmission power of the second-type channel or signal does not exceed a first preset threshold; the sum of the receiving power of the first-type channel or signal and the receiving power of the second-type channel or signal does not exceed a second preset threshold; the carrier frequency where the first-type channel or signal is located is less than the preset value; the carrier frequency where the second-type channel or signal is located is less than the preset value; no quasi co-located reference signal associated with the spatial receiving filter parameter exist in the all quasi co-located reference signals associated with the first-type channel or signal; no quasi co-located reference signal associated with the spatial receiving filter parameter exists in the all quasi co-located reference signals associated with the second-type channel or signal; the first-type channel or signal is not configured with the spatial transmission filter parameter information; or the second-type channel or signal is not configured with the spatial transmission filter parameter information.

In some embodiments, the request information and/or the signaling information includes X pieces of physical resource block group information, the frequency domain resource occupied by the first-type channel or signal includes X physical resource block groups, second-type power information values in the acquisition parameter of the first-type power information in each of the X physical resource block groups are the same, one of the X physical resource block groups includes one or more physical resource blocks, and X is a positive integer.

In some embodiments, the method satisfies at least one of: the second-type power information in the acquisition parameter of the first-type power information in one of the X physical resource block groups is power information satisfying a preset feature in multiple pieces of power information of the second channel or signal associated with the physical resource blocks included in the one of the X physical resource block groups; where the preset feature is a maximum value, or a minimum value, of multiple power, or power of DA in preset PRB, such as power of DA in lowest PRB resource block; the second-type power information in the acquisition parameter of the first-type power information in one of the X physical resource block groups is an average value of multiple pieces of power information of the second channel or signal associated with the physical resource blocks included in the one of the X physical resource block groups; a division of the physical resource block groups is the same on different time domain symbol resource sets occupied by the first-type channel or signal; continuous physical resource blocks occupied by the first-type channel or signal belong to one physical resource block group; discontinuous physical resource blocks occupied by the first-type channel or signal belong to different physical resource block groups; the division of the physical resource block groups is determined according to the received signaling information; the physical resource block groups are associated with precoding resource group information of the first-type channel or signal; or an intersection between different physical resource block groups is empty.

In some embodiments, the first-type power information includes at least one of: maximum power, a power headroom, target receiving power, transmission power, receiving power, an acquisition parameter of the transmission power, or an acquisition parameter of the receiving power; and/or the second-type power information includes at least one of: maximum power, a power headroom, target receiving power, transmission power, receiving power, an acquisition parameter of the transmission power, or an acquisition parameter of the receiving power; and/or the third-type power information includes at least one of: maximum power, a power headroom, target receiving power, transmission power, receiving power, an acquisition parameter of the transmission power, or an acquisition parameter of the receiving power.

In some embodiments, at least one of the request information or the signaling information may include at least one of: information on whether the first-type channel or signal shares power with the second-type channel or signal at the first communication node; multiplexing manner information of the first-type channel or signal and the second-type channel or signal; whether the sum of the transmission power of the first-type channel or signal and the transmission power of the second-type channel or signal needs to be less than the first preset value; whether the sum of the receiving power of the first-type channel or signal and the receiving power of the second-type channel or signal needs to be less than the second preset value; whether the component carrier where the first-type channel or signal is located and the CC where the second-type channel or signal is located belong to one frequency band; the relationship between the carrier frequency where the second-type channel or signal is located and the preset value; whether the quasi co-located reference signal associated with the spatial receiving filter parameter exists in the all quasi co-located reference signals associated with the second-type channel or signal; or whether the second-type channel or signal is configured with the spatial transmission filter parameter information.

Embodiment Seven

Figure 13:
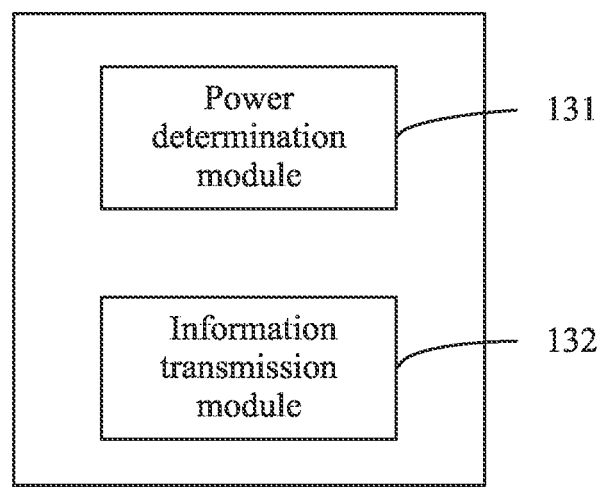
FIG. 13 is a flowchart of a signal transmission method in embodiment seven of the present application.

This embodiment provides a signal transmission apparatus. Please refer to FIG. 13, this signal transmission apparatus includes a power determination module 131 and an information transmission module 132. The power determination module 131 is configured to determine power information of a channel or a signal by a fourth communication node according to received first signaling information or an agreed rule. The information transmission module is configured to transmit the channel or the signal according to the determined power information.

In some embodiments, at least two time domain symbols occupied by the channel or the signal include C time domain symbol sets, each of the C time domain symbol sets is associated with a set of power information; where C is a positive integer less than or equal to 1.

In some embodiments, the C time domain symbol sets include a first time domain symbol set and a second time domain symbol set, and an intersection between the first time domain symbol set and the second time domain symbol set is an empty set; and/or an intersection between any two time domain symbol sets in the C time domain symbol sets is an empty set.

In some embodiments, the multiple time domain symbols occupied by the channel or the signal fall in one time unit; and/or the multiple time domain symbols occupied by the channel or the signal are scheduled by one control signaling.

In some embodiments, the first signaling information includes a set of power information associated with each time domain resource set of the C time domain symbol sets; the C time domain symbol sets are associated with C sets of power information, where the C sets of power information are different configuration values for a same-type power parameter set.

In some embodiments, the power information of the channel or the signal is associated with at least one of following information: the first signaling information, request information transmitted by a fourth communication node, a multiplexing manner between A links, whether frequency domain resources occupied by the channel or the signal in the A links overlap, where A is a positive integer greater than or equal to 1.

In some embodiments, the first signaling information includes a mapping relation between SRI and power information, where a same SRI value corresponds to at least one set of power information.

In some embodiments, the method may further include: the fourth communication node receives second signaling information, where the second signaling information is selected from one of at least one set of power information corresponding to a same SRI value.

In some embodiments, the first signaling information may be RRC signaling information, and the second signaling information may be MAC-CE signaling information.

In some embodiments, the first signaling information includes the power information, where a mapping relation between an indicated value in the first signaling information and a power information value is determined according to a resource where the first signaling information is located; and/or the first signaling information includes the power information, where the mapping relation between the indicated value in the first signaling information and the power information value is determined according to a resource where the channel or the signal is located; where the resource includes at least one of a time domain resource, a frequency domain resource, a sequence resource or a space domain resource.

In some embodiments, the method may further include: the power information of the channel or the signal is determined according to a multiplexing manner between A links; where the channel or the signal belongs to at least one link of the A links.

In some embodiments, the power information includes at least one of: target receiving power, maximum transmission power, a power headroom, a reference signal for calculating path loss, a path loss adjustment factor, a power process, or a power adjustment amount.

According to the signal transmission apparatus provided in this embodiment, the fourth communication node determines the power information of the channel or the signal according to the received first signaling information or the agreed rule; the channel or the signal is transmitted according to the determined power information, so that the determination of associated power information with channels and signals between multiple communication nodes in some particular implementations may achieve technical effects including, but not limited to, better power control, and improved power utilization efficiency.

Embodiment Eight

Figure 14:
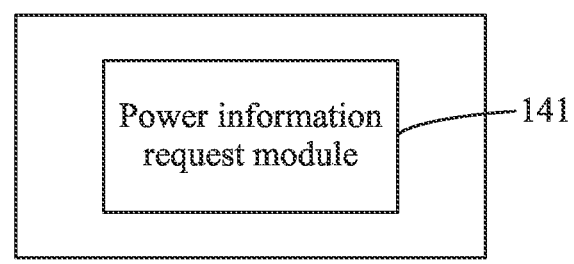
FIG. 14 is a schematic diagram of a power determination apparatus in embodiment eight of the present application.

This embodiment provides a power determination apparatus. Please refer to FIG. 14, this signal determination apparatus includes a power information request module 141. The power information request module 141 is configured to request or feed back, to a second communication node, power information associated with a first-type channel or signal between a first communication node and the second communication node.

In some embodiments, the power information may include at least one of: transmission power of the first-type channel or signal transmitted by the second communication node; receiving power of the first-type channel or signal received by the first communication node; a difference value between the receiving power of the first-type channel or signal received by the first communication node and receiving power of the second-type channel or signal received by the first communication node; a difference value between the receiving power of the first-type channel or signal received by the first communication node and the receiving power of the first-type channel or signal received by the first communication node; or one or more parameters in transmission power acquisition parameters of the second-type channel or signal; where the receiving power includes actual receiving power and/or target receiving power, and the second-type channel or signal I s a channel or a signal between the first communication node and one or more third communication nodes.

In some embodiments, the first-type channel or signal is a downlink channel or signal; and/or the first-type channel or signal is a channel or a signal transmitted by the first communication node to the second communication node.

In some embodiments, the first-type channel or signal is an uplink channel or signal; and/or the first-type channel or signal is a channel or a signal transmitted by the first communication node to the second communication node.

In some embodiments, the power information includes at least one of maximum power, a power headroom, target receiving power, transmission power, receiving power, an acquisition parameter of the transmission power, or an acquisition parameter of the receiving power.

In some embodiments, scheduling information of the first-type channel or signal is transmitted to the first communication node by the second communication node.

According to the power determination apparatus provided in this embodiment, the first communication node requests the power information associated with the first-type channel or signal between the first communication node and the second communication node, to the second communication node, so that the determination of associated power information with channels and signals between multiple communication nodes in some particular implementations may achieve technical effects including, but not limited to, better power control, and improved power utilization efficiency.

Embodiment Nine

Figure 15:
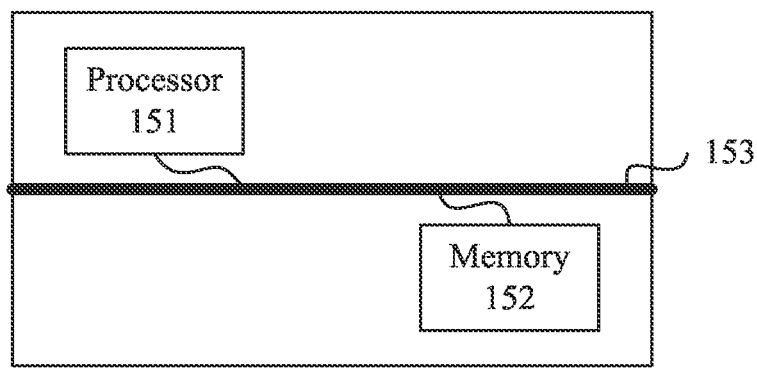
FIG. 15 is a schematic diagram of a composition of a network device in embodiment nine of the present application.

This embodiment further provides a network device. Please refer to FIG. 15, the network device includes a processor 151, a memory 152, and a communication bus 153. The communication bus 153 is configured to enable a connection communication between the processor 151 and the memory 152. The processor is configured to execute one or more computer programs stored in the memory 152, to implement steps of the power determination method or the signal transmission method in the foregoing multiple embodiments, which however are not to be detailed herein again.

This embodiment further provides a computer readable storage medium. The computer readable storage medium includes volatile or non-volatile, removable or non-removable media implemented in any method or technology for storage of information (such as computer readable instructions, data structures, computer program modules or other data). The computer readable storage media include a random access memory (RAM), a read-only memory (ROM), an electrically erasable programmable read-only memory (EEPROM), a flash memory or other memory technology, a compact disc read-only memory (CD-ROM), a digital versatile disks (DVD) or other optical disk storage, a magnetic cassette, a magnetic tape, a magnetic disk storage or other magnetic storage apparatuses, or any other medium which may be used for storing the desired information and which may be accessed by a computer.

The computer readable storage medium in this embodiment may be used for storing one or more computer programs, the stored one or more computer programs are executable by a processor to implement at least one step of the power determination method and the signal transmission method in the various embodiments described above.

This embodiment further provides a computer program (or referred to as a computer software). The computer program may be distributed over a computer readable medium, executed by a computable apparatus, to implement at least one step of the power determination method, or at least one step of the signal transmission method, in multiple embodiments described above.

This embodiment further provides a computer program product. The computer program product includes a computer readable apparatus, this computer readable apparatus stores the computer program as shown above. This computer readable apparatus in this embodiment may include a computer readable storage medium as shown above.

It will be apparent to those skilled in the art that all or some of particular steps, systems, functional modules/units in an apparatus in the methods disclosed above may be implemented as software (which may be implemented in a computer program code executable by a computing apparatus), firmware, hardware, and suitable combinations thereof. In hardware implementation, a division between functional modules/units mentioned in the above description does not necessarily correspond to the division of physical assemblies; for example, one physical assembly may have multiple functions, or one function or step may be performed cooperatively by multiple physical assemblies. Some or all of the specific physical assemblies may be implemented as software executed by a processor such as a central processor, a digital signal processor, or a microprocessor, or as hardware, or as an integrated circuit such as an application specific integrated circuit.

Further, it is well known to those of ordinary skill in the art that communication media typically contain computer readable instructions, data structures, computer program modules, or other data in a modulated data signal, such as a carrier wave or other transport mechanism, and may include any information delivery media. The present application, therefore, is not limited to any particular combination of hardware and software.

What is claimed is:

1. A signal transmission method, comprising:
   determining, by a fourth communication node, power information of one channel or one signal according to received first signaling information; and
   transmitting the one channel or the one signal according to the determined power information,
   wherein N time domain symbols occupied by the one channel or the one signal comprise C time domain symbol sets, each of the C time domain symbol sets is associated with one set of power information from C sets of power information; wherein N is a positive integer larger than 1, and C is a positive integer less than or equal to N, and
   the first signaling information comprises the C sets of power information, wherein each of the C sets of power information is associated with one time domain resource set of the C time domain symbol sets,
   wherein the N time domain symbols occupied by the one channel or the one signal fall in one slot, and the N time domain symbols occupied by the one channel or the one signal are scheduled by one control signaling, and
   wherein transmitting the one channel or the one signal according to the determined power information comprises: transmitting the one channel or the one signal on the C time domain symbol sets respectively according to the C sets of power information associated with the C time domain symbol sets.

2. The signal transmission method of claim 1, wherein the method satisfies:
   the C time domain symbol sets comprise a first time domain symbol set and a second time domain symbol set, and an intersection between the first time domain symbol set and the second time domain symbol set is an empty set.

3. The signal transmission method of claim 1, wherein the method satisfies:
   the C time domain symbol sets are associated with C sets of power information, wherein the C sets of power information are different configuration values for a same-type power parameter set.

4. The signal transmission method of claim 1, wherein there is an association between the power information of the one channel or the one signal and at least one of following information: request information transmitted by the fourth communication node, a multiplexing manner between A links, whether frequency domain resources occupied by the one channel or the one signal in the A links overlap, or a relationship between a sum of power of channels or signals in B links and a preset value, wherein A and B are positive integers greater than 1,
   wherein the power information of the one channel or the one signal is got according to the at least one of above information, or the at least one of above information is got according to the power information of the one channel or the one signal, or some particular combined value of the power information of the one channel or the one signal and the at least one of above information may not occur at the same time.

5. The signal transmission method of claim 1, wherein the method satisfies at least one of:
   the first signaling information comprises a mapping relation between reference signal resource indication information and power information, wherein same reference signal resource indication information corresponds to one or more sets of power information; or the first signaling information comprises a mapping relation between reference signal resource indication information and time advance (TA), wherein same reference signal resource indication information corresponds to one or more sets of time advance information.

6. The signal transmission method of claim 5, wherein the method satisfies at least one of:

the fourth communication node receives second signaling information, wherein the second signaling information comprises selection information among the one or more sets of power information, and the selected power information serves as power information of one channel or one signal associated with the reference signal resource indication information;

the first signaling information is RRC signaling information, and the second signaling information is MAC-CE signaling information; or the first signaling information is the RRC signaling information, and the second signaling information is physical layer dynamic control information.

7. The signal transmission method of claim 1, wherein the method satisfies at least one of:

the first signaling information comprises an indicated value of the power information, wherein a mapping relation between the indicated value in the first signaling information and a power information value is determined according to a resource where the first signaling information is located; or the first signaling information comprises the indicated value of the power information, wherein the mapping relation between the indicated value in the first signaling information and the power information value is determined according to a resource where the one channel or the one signal is located;

wherein the resource comprises at least one of a time domain resource, a frequency domain resource, a sequence resource or a space domain resource.

8. The signal transmission method of claim 1, further comprising:

determining the power information of the one channel or the one signal according to a multiplexing manner between A links; wherein the one channel or the one signal belongs to at least one link of the A links.

9. The signal transmission method of claim 1, wherein the power information comprises at least one of:

target receiving power, maximum transmission power, a power headroom, a reference signal for calculating path loss, a path loss adjustment factor, a power process, or a power adjustment amount.

10. A signal transmission apparatus, comprising:

a power determination module, which is configured to determine power information of one channel or one signal according to received first signaling information; and an information transmission module, which is configured to transmit the one channel or the one signal according to the determined power information, wherein N time domain symbols occupied by the one channel or the one signal comprise C time domain symbol sets, each of the C time domain symbol sets is associated with one set of power information from C sets of power information; wherein N is a positive integer larger than 1, and C is a positive integer less than or equal to N, and the first signaling information comprises the C sets of power information, wherein each of the C sets of power information is associated with one time domain resource set of the C time domain symbol sets, wherein the N time domain symbols occupied by the one channel or the one signal fall in one slot, and the N time domain symbols occupied by the one channel or the one signal are scheduled by one control signaling, and wherein the information transmission module is further configured to: transmit the one channel or the one signal on the C time domain symbol sets respectively according to the C sets of power information associated with the C time domain symbol sets.

11. The signal transmission apparatus of claim 10, wherein the method satisfies:

the C time domain symbol sets comprise a first time domain symbol set and a second time domain symbol set, and an intersection between the first time domain symbol set and the second time domain symbol set is an empty set.

12. The signal transmission apparatus of claim 10, wherein the method satisfies:

the C time domain symbol sets are associated with C sets of power information, wherein the C sets of power information are different configuration values for a same-type power parameter set.

13. A signal receiving method, comprising:

transmitting, by a second communication node, first signaling information to a fourth communication node, wherein the first signaling information comprises power information of one channel or one signal; and receiving, by the second communication node, the one channel or the one signal transmitted by the fourth communication node, wherein N time domain symbols occupied by the one channel or the one signal comprise C time domain symbol sets, each of the C time domain symbol sets is associated with one set of power information from C sets of power information; wherein N is a positive integer larger than 1, and C is a positive integer less than or equal to N, and the first signaling information comprises the C sets of power information, wherein each of the C sets of power information is associated with one time domain resource set of the C time domain symbol sets, wherein the N time domain symbols occupied by the one channel or the one signal fall in one slot, and the N time domain symbols occupied by the one channel or the one signal are scheduled by one control signaling, and wherein the one channel or the one signal is transmitted by the fourth communication node on the C time domain symbol sets respectively according to the C sets of power information associated with the C time domain symbol sets.

14. The signal receiving method of claim 13, wherein the method satisfies:

the C time domain symbol sets comprise a first time domain symbol set and a second time domain symbol set, and an intersection between the first time domain symbol set and the second time domain symbol set is an empty set.

15. The signal receiving method of claim 13, wherein the method satisfies:

the C time domain symbol sets are associated with C sets of power information, wherein the C sets of power information are different configuration values for a same-type power parameter set.

16. The signal receiving method of claim 13, wherein the power information comprises at least one of:
  target receiving power, maximum transmission power, a power headroom, a reference signal for calculating path loss, a path loss adjustment factor, a power process, or a power adjustment amount.

\* \* \* \* \*